United States Patent [19]

Burke et al.

[11] Patent Number: 5,448,737
[45] Date of Patent: Sep. 5, 1995

[54] SYSTEM AND METHOD FOR OPTIMIZING COMPUTER CODE USING A COMPACT DATA FLOW REPRESENTATION

[75] Inventors: Michael G. Burke, Yonkers; Jong-Deok Choi, Mount Kisco, both of N.Y.; Ronald G. Cytron, University City, Mo.

[73] Assignee: International Business Machines Corporation, Armonk, N.Y.

[21] Appl. No.: 852,866

[22] Filed: Mar. 17, 1992

[51] Int. Cl.$^6$ ............................................... G06F 9/44
[52] U.S. Cl. ................................. 395/700; 364/280.4; 364/280.5
[58] Field of Search ............... 395/700; 364/300, 280.5

[56] References Cited

U.S. PATENT DOCUMENTS

| | | | |
|---|---|---|---|
| 4,773,007 | 9/1988 | Kanada et al. | 364/300 |
| 4,802,091 | 1/1989 | Cooke et al. | 364/300 |
| 5,146,594 | 9/1992 | Iitsuka | 395/700 |
| 5,175,856 | 12/1992 | Van Dyke et al. | 395/700 |
| 5,327,561 | 7/1994 | Choi et al. | 395/700 |

OTHER PUBLICATIONS

J. D. Choi, "Parallel Program Debugging with Flowback Analysis", Ph.D. Thesis, University of Wisconsin—Madison (1989).
Cytron et al., "An Efficient Method of Computing Static Single Assignment Form", *ACM Transactions on Programming Languages and Systems*, pp. 25–35, (1989).
Choi et al., "Automatic Construction of Sparse Data Flow Evaluation Graphs", (1991).
Choi et al., "On the Efficient Treatment of Preserving Definitions", submitted for publication to IEEE Transactions on Software Engineering, (Jul. 1991).
Choi et al., U.S. Patent Appln. Ser. No. 07/763,099, filed Sep. 20, 1991, and assigned to IBM Corporation, entitled "System and Method for Solving Monotone Information Propagation Problems".
Choi et al., "Techniques for Debugging Parallel Programs with Flowback Analysis", *ACM Transactions on Programming Languages and Systems*, vol. 13, No. 4, pp. 491–530, (Oct. 1991).
Cytron et al., "Efficiently Computing Static Single Assignment Form and the Control Dependence Graph", *ACM Transactions on Programming Languages and Systems*, vol. 13, No. 4, pp. 451–490, (Oct. 1991).
Carl McConnell & Ralph E. Johnson, "Using Static Single Assignment Form in a Code Optimizer", 1992 ACM.

*Primary Examiner*—Kevin A. Kriess
*Assistant Examiner*—Matthew M. Payne
*Attorney, Agent, or Firm*—Louis J. Percello; Sterne, Kessler, Goldstein & Fox

[57] ABSTRACT

The present invention provides a system and method for optimizing or parallelizing computer code typically represented by a source program. The source program is represented by a control flow graph. The present invention includes an optimizer for constructing a compact data flow representation from the control flow graph and a mechanism for evaluating the compact data flow representation in relation to a data flow framework in order to determine a solution to a particular data flow problem. The present invention represents data flow chains compactly, obtaining some of the advantages of Static Single Assignment (SSA) form without modification of program text (i.e., renaming). In addition, the present invention represents compactly certain data flow chains which SSA form fails to represent (i.e. def-def, use-def, and use-use chains). The data flow representation of the present invention combines information only once in the graph, information is forwarded directly to where it is needed, and useless information is not represented.

24 Claims, 20 Drawing Sheets

1140

SYSTEM AND METHOD FOR OPTIMIZING COMPUTER CODE USING A COMPACT DATA FLOW REPRESENTATION

TECHNICAL FIELD

The present invention relates generally to a system and method of efficiently handling compiler optimization problems, and more particularly, to a system and method for efficiently representing data flow information without bit-vector operations.

BACKGROUND ART

Solutions to information problems are needed in most optimizing and parallelizing compilers and software development environments. Compiler optimization problems are typically formulated as data flow frameworks, in which the solution of a given problem at a given program point is related to the solution at other points (Rosen, B. K., *Data Flow Analysis for Procedural Languages*, J. ACM 26, (2) (April 1979), pg. 322-344; Tarjan, R., Journal of the Association for Computing Machinery 28, (3) (1981), pg. 594-614). Such problems can be solved by iterating over nodes of a control flow graph until the solution (over all nodes) converges. The quality and speed of evaluating these frameworks are well-understood, and data flow methods are understandably prevalent in most optimizing compilers.

Traditional methods for solving data flow problems fall into one of two categories: bit-vectoring and direct connections. Bit-vectoring methods propagate the solution at a given node of a control flow graph to the successors or predecessors of that node (Kildall, G., Conference Record of First ACM Symposium on Principles of Programming Languages, 194-206 (January 1973)). Compiler writers generally acknowledge that bit-vectors are overly consumptive of space. Moreover, propagation occurs throughout a graph, sometimes in regions that neither affect nor care about the global solution.

The other prevalent solution uses direct-connections (i.e., data flow chains (def-def, def-use, and use-def chains)) that shorten the propagation distance between nodes that generate and use data flow information. Such solutions are typically based on def-use chains (see Aho et al., *Compilers: Principles, Techniques, and Tools*, Addison-Wesley (1986)). Def-use chains omit nodes from the flow graph that need not participate in the evaluation. Often and unfortunately, direct-connections require combining the same information at each use of particular variable, rather than just once. In the worst case, a quadratic number of "meets" can occur where a linear number suffices. Once established, direct connections allow propagation directly from sites that generated information to sites that use information. Although information does not propagate unnecessarily through the graph, the same information could be combined many times, whereas earlier combining would be more efficient.

Optimizing compilers typically gather compile-time invariant information about a program by posing (and solving) a series of problems, such as Common Subexpression Elimination, Invariant Detection, Constant Propagation, and Dead Code Elimination.

Consider Constant Propagation as an example of a data flow problem. Referring to the flow graph fragment shown in FIG. 1, Constant Propagation would like to prove that the assignments to w, y, and z store the constant 5. Constant Propagation must therefore prove that x is constant when each of these variables is assigned. Thus, information associated with the two definitions of x must propagate through the flow graph. At node A, the two values for x are combined. In this example, x is the constant 5 at node A. When this information reaches the assignments to w, y, and z, each assignment receives the constant 5.

An apparent inefficiency with such propagation is that information about the variable x must be propagated through nodes of the graph that do not "care" about the value of x. In fact, most implementations compute and propagate solutions by reserving a "bit" for each variable in the program. Thus, a program with 25 assignments and 100 nodes requires 100 bit vectors, each with a length of 25 bits. Since most nodes assign at most one variable, much of this information is wasted.

Consequently, many optimizing compilers construct def-use chains, which directly connect assignments to a variable with uses of the variable's value. The graph in FIG. 2 shows how such chains are constructed for our example. Now, information about the variable x can be directly forwarded to the assignments w, y, and z, avoiding all other nodes.

Unfortunately, the def-use representation shown in FIG. 2 requires that the information be combined three times (once at each node), rather than just once at node A. Such redundancy can increase analysis by an order of magnitude, as shown in FIG. 3a. There are nine def-use chains between references to x. If the information for the definitions were combined at the merge node (A), then there would be only three def-use chains to the merge node, and one chain from the merge node to each of the uses of x. In general, such an example could contain $O(n^2)$ chains, where n is the number of nodes in the graph, without combining at the merge node. Whereas combining at the merge node yields $O(n)$ chains. Experiments have shown that such behavior is noticeable especially for arrays, aliased variables, and variables modified at procedure call sites. Moreover, def-use chains are themselves computed by solving two data flow problems, Reaching Definitions and Live Variables, so at some phase of analysis, bit vectors would still be required.

Recently, Static Single Assignment (SSA) form has yielded more efficient and powerful solutions for data flow problems (see Cytron et al., *An Efficient Method for Computing Static Single Assignment Form*, Sixteenth Annual ACM Symposium on Principles of Programming Languages, 25-35 (January 1989)). SSA form is a direct connection structure which combines the best of the two previous mechanisms. Characteristic problems solved have been constant propagation (Wegman et al., Conf. Rec. Twelfth ACM Symposium on Principles of Programming Languages, pgs. 291-299 (January 1985)), global value numbering (Bowen et al., Fifteenth ACM Principles of Programming Languages Symposium, pgs. 1-11 San Diego, Calif., (January 1988)), and invariance detection (Cytron et al., Conf. Rec. of the ACM Symp. on Principles of Compiler Construction (1986)). Once programs are cast into SSA form, data flow solutions for these problems have the following advantages: (1) information is combined as early as possible, (2) information is forwarded directly to where it is needed, and (3) useless information is not represented. These advantages follow from the way definitions are connected to uses in a program. For example, FIG. 3b shows an example of how SSA form reduces def-use chains (compared with FIG. 3a) with a special feature called $\phi$-functions (described in greater detail below).

However, SSA form does have a variety of disadvantages, such as renaming or modifying portions of the program text, and not being able to efficiently handle certain types of definitions called preserving definitions. In addition, SSA form cannot handle certain type of data flow chains, such as def-def, use-def, and use-use chains. These data flow chains are extremely important for parallelizing compilers.

Disclosure of Invention

In view of the foregoing, the present invention provides a system and method for optimizing or parallelizing computer code typically represented by a source program and for solving data flow problems. The present invention represents data flow chains compactly, obtaining some of the advantages of SSA form without modification of program text (i.e., renaming).

Data flow problems are typically associated with compilers and/or optimizers. The source program is entered into the compiler/optimizer and represented by a control flow graph. Special functions called $\phi$-functions are placed into the control flow graph and a compact data flow representation is constructed based on the dominator tree of the control flow graph. Finally, the control flow graph is evaluated using the compact representation in order to determine a solution to the data flow problem.

In experimental measurements, this compact representation substantially reduces the size of data flow information required for optimization of real programs over conventional techniques. In addition, the present invention represents compactly certain data flow chains which SSA form fails to represent (i.e. def-def, use-def, and use-use chains).

The compact data flow representation of the present invention combines information only once in the graph, information is forwarded directly to where it is needed, and useless information is not represented. The present invention is based on Cytron et al., *An Efficient Method for Computing Static Single Assignment Form*, Sixteenth Annual ACM Symposium on Principles of Programming Languages, pgs. 25-35 (January 1989) and/or Cytron et al., *Efficiently Computing Static Single Assignment Form and the Control Dependence Graph*, ACM Transactions on Programming Languages and Systems, pgs. 451–490 (1991) (hereinafter Cytron I and Cytron II, respectively), which are both hereby incorporated by reference herein in their entirety.

The present invention differs specifically with respect to arrays, variables modified by procedure calls, and aliased variables. For example, FIG. 5a shows how the published SSA algorithm would model the potential modification of the variable X at the call site. On the other hand, FIG. 5b shows how the present invention represents the same information, but without modification to the control flow graph. In fact, the present invention analysis does not modify the program representation in any manner, but rather constructs look-aside tables to represent the data flow properties of the program.

BRIEF DESCRIPTION OF THE DRAWINGS

The foregoing and other features and advantages of the invention will be apparent from the following more particular description of the preferred embodiments of the invention, as illustrated in the accompanying drawings in which:

FIG. 11b shows a dominator tree for the CFG shown in FIG. 11a.

BEST MODE FOR CARRYING OUT THE INVENTION

I. Environment of the Present Invention

A more detailed description of some of the basic concepts discussed in this section is found in a number of references, including Aho et al., Compilers: Principles, Techniques, and Tools Addison-Wesley (1986) which is hereby incorporated by reference herein in its entirety.

Figure 4:
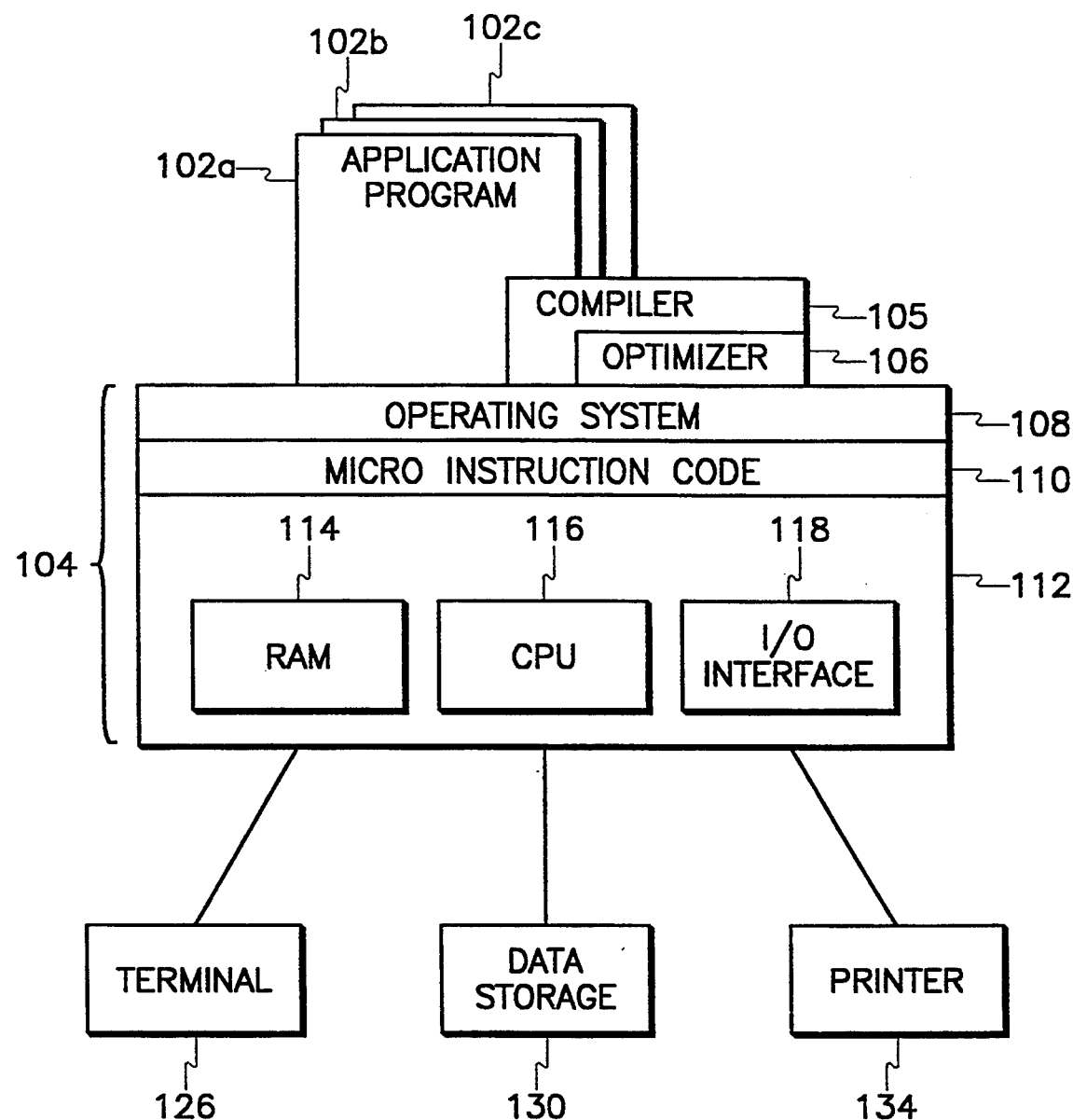
FIG. 4 shows an example of an environment for the preferred embodiment of the present invention.
Figure 5A:
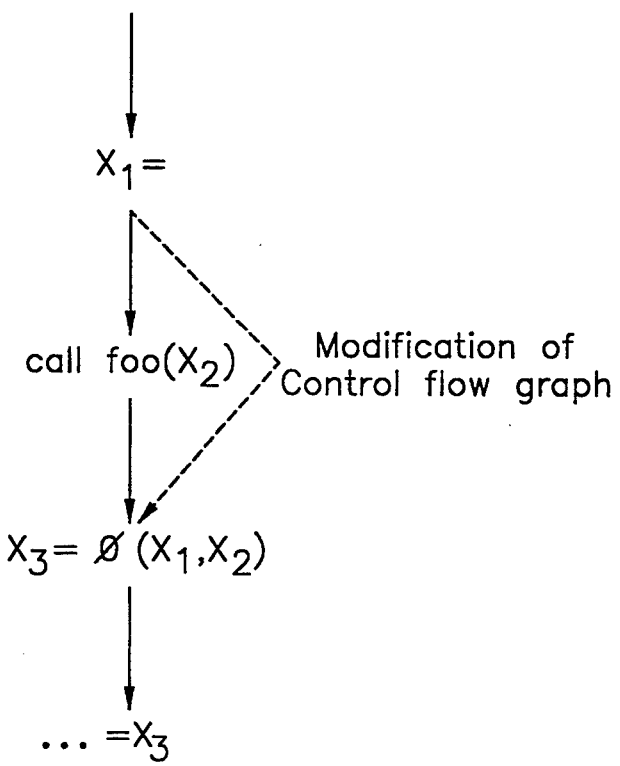
FIG. 5a shows an example of how SSA form would modify a CFG.
Figure 5B:
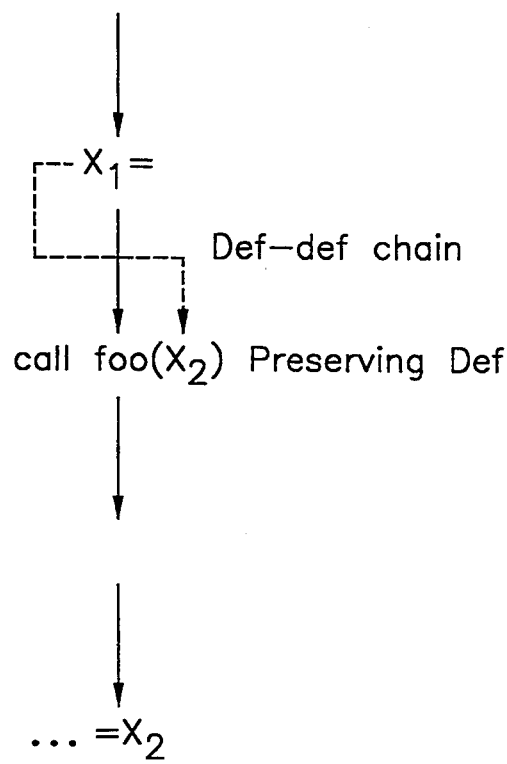
FIG. 5b shows an example of how the present invention would model the same information shown in FIG. 5a without modification of the CFG.

FIG. 4 illustrates an environment in which a preferred embodiment of the present invention operates. The preferred embodiment of the present invention includes application programs 102 and a compiler 105. The compiler 105 is configured to transform a source program into optimized executable code or more generally from a source program to an optimized form. Optimizer 106 makes up a portion of the compiler 105. The preferred embodiment of the present invention operates within the optimizer 106.

The compiler operates on a computer platform 104. The computer platform 104 includes a hardware unit 112 which includes multiple central processing units (CPU) 116, a random access memory (RAM) 114, and an input/output interface 118. The computer platform 104 includes an operating system 108, and may include micro-instruction code 110 (or a reduced instruction set, for instance). Various peripheral components may be connected to the computer platform 104, such as a terminal 126, a data storage device 130, and a printing device 134.

In a preferred embodiment of the present invention, the computer 102 is any personal or mainframe computer. The operating system 106 may be any operating system compatible with the computer 102 being utilized.

Those skilled in the art will readily understand the equivalents to the above structure.

II. Background

Many of the concepts discussed below can be found in Cytron I and/or Cytron II.

A. Control Flow Graph

The statements of a program are organized into (not necessarily maximal) basic blocks, where program flow enters a basic block at its first statement and leaves the basic block at its last statement. A control flow graph (CFG) is a directed graph whose nodes are the basic blocks of a program and two additional nodes, Entry and Exit. The edges of the control flow graph ($E_{CFG}$) represent transfers of control or jumps between the basic blocks. In addition, there is an edge from Entry to any basic block at which the program can be entered, and there is an edge to Exit from any basic block that can exit the program. Moreover, there is also an edge from Entry to Exit. We assume that each node is on a path from Entry and on a path to Exit. For each node X, successor of X is any node Y with an edge X→Y in the graph, and Succ(X) is the set of all successors of X; similarly for predecessors. A node with more than one successor is a branch node; a node with more than one predecessor is a join node. Finally, each variable is considered to have an assignment in Entry to represent whatever value the variable may have when the program is entered. This assignment is treated just like the ones that appear explicitly in the program.

B. Dominator Trees

Let X and Y be nodes in the CFG of a program. If X appears on every path from Entry to Y, then X dominates Y. Domination is both reflexive and transitive. If X dominates Y and X≠Y, then X strictly dominates Y. In formulas, we write X>>Y for strict domination and X≥≥Y for domination. If X does not strictly dominate Y, we write X$\not>\not>$Y. The immediate dominator of Y (denoted idom(Y)) is the closest strict dominator of Y on any path from Entry to Y. In a dominator tree, the children of a node X are all immediately dominated by X. The root of a dominator tree is Entry, and any node Y other than Entry has idom(Y) as its parent in the tree.

The dominator tree of the CFG has exactly the same set of nodes as the CFG, but a very different set of edges. In this document, the words predecessor, successor, and path always refer to the CFG. The words parent, child, ancestor, and descendent always refer to the dominator tree.

C. Dominance Frontiers

The dominance frontier DF(X) of a CFG node X is the set of all CFG nodes Y such that X dominates a predecessor of Y but does not strictly dominate Y, denoted by DF(X)={Y|( P$\epsilon$Pred(Y))(X≥≥P and X$\not>\not>$Y)}. Computing DF(X) directly from the definition would require searching much of the dominator tree. The total time to compute DF(X) for all nodes X would be quadratic, even when the sets themselves are small. To compute the dominance frontier mapping in time linear in the size $\Sigma X|DF(X)|$ of the mapping, we define two intermediate sets $DF_{local}$ and $DF_{up}$ for each node such that the following equation holds:

$$DF(X) = DF_{local}(X) \cup \underset{Z \epsilon\ children(X)}{\cup} DF_{up}(Z) \quad (1)$$

Given any node X, some of the successors of X may contribute to DF(X). This local contribution $DF_{local}(X)$ is defined by $$DF_{local}(X) \overset{def}{=} \{Y \epsilon Succ(X) | X \not>\not> Y\} \quad (2)$$

Given any node Z that is not the root Entry of the dominator tree, some of the nodes in DF(Z) may contribute to DF(idom(Z)). The contribution $DF_{up}(Z)$ that Z passes up to idom(Z) is defined by $$DF_{up}(Z) \overset{def}{=} \{Y \epsilon DF(z) | idom(Z) \not>\not> Y\} \quad (3)$$

The procedure for determining the dominance frontier is shown in TABLE 1 below. The /*local*/ line effectively computes $DF_{local}(X)$ on the fly and uses it in (1) without needing to devote storage to it. The /*up*/ line is similar for $DF_{up}(Z)$. The dominator tree is traversed bottom-up, visiting each node X only after visiting each of its children.

TABLE 1

```
for each X in a bottom-up traversal of the dominator
     tree do
          DF(X) ← 0
          for each Y ε Succ(X) do
/*local*/      if idom(Y)≠X then DF(X) ← DF(X)∪{Y}
          end
          for each Z ε Children(X) do
               for each Y ε DF(Z) do
/*up*/           if idom(Y)≠X then DF(X) ← DF(X)∪{Y}
               end
          end
end
```

II. The Compact Data Flow Representation

Figure 1:
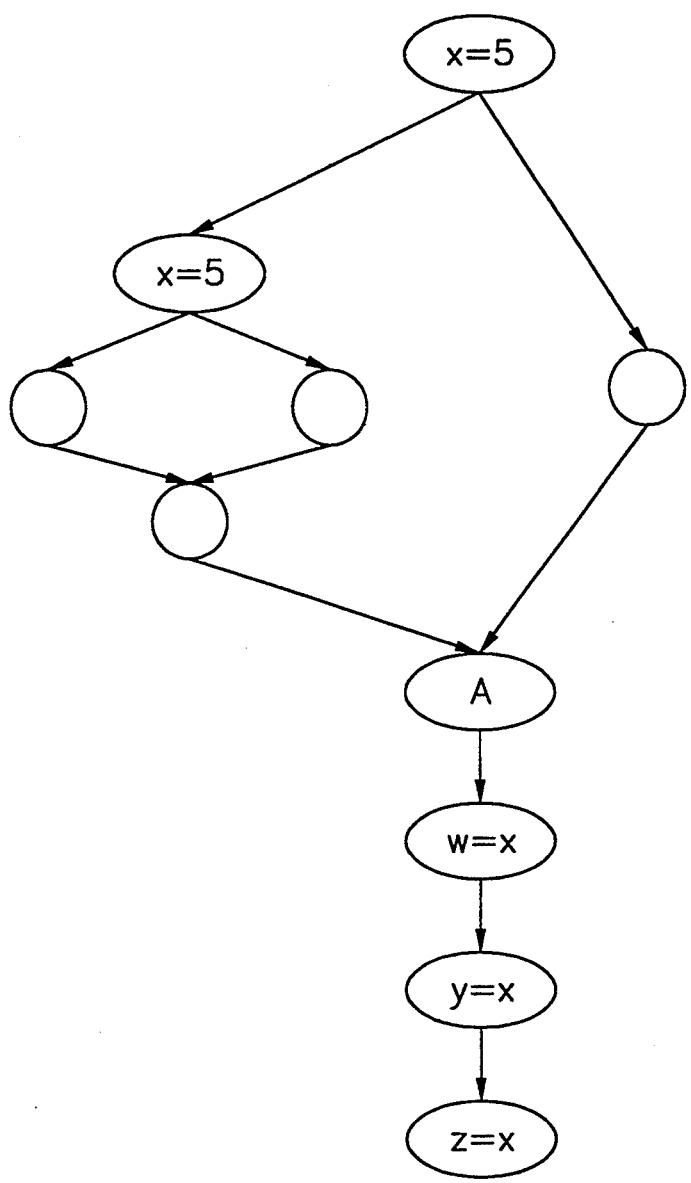
FIG. 1 shows a Control Flow Graph (CFG) fragment used to illustrate a Constant Propagation example.
Figure 2:
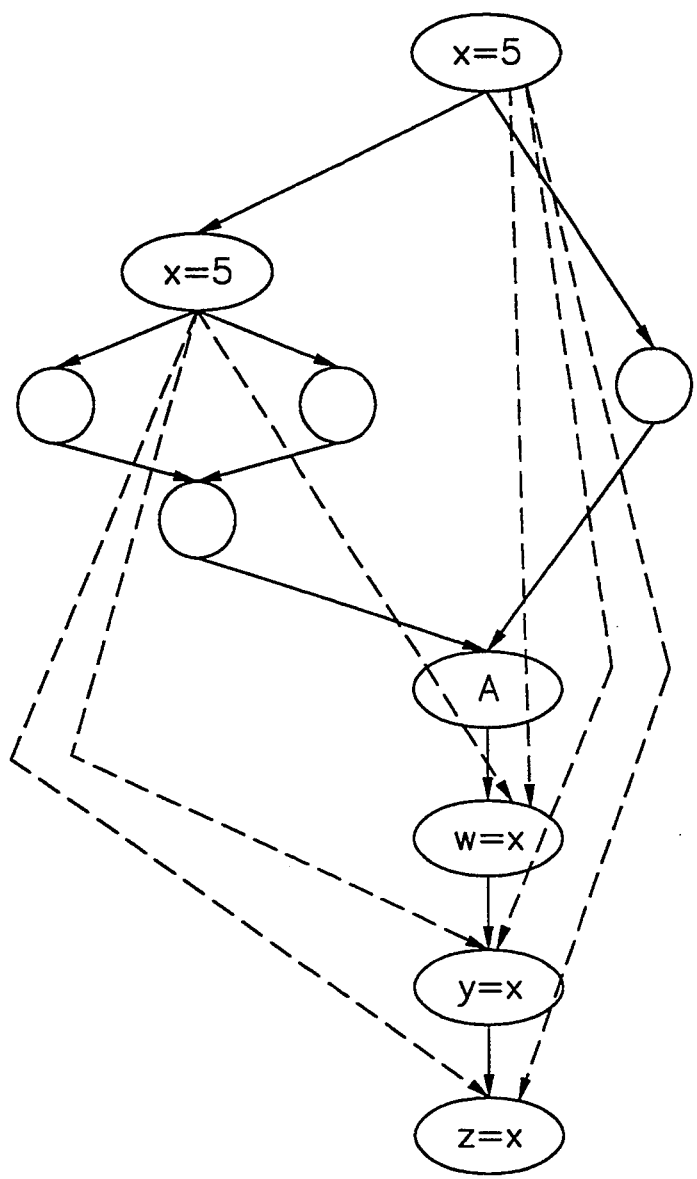
FIG. 2 shows an example of using def-use chains to solve the Constant Propagation problem for the CFG in FIG. 1.
Figure 3A:
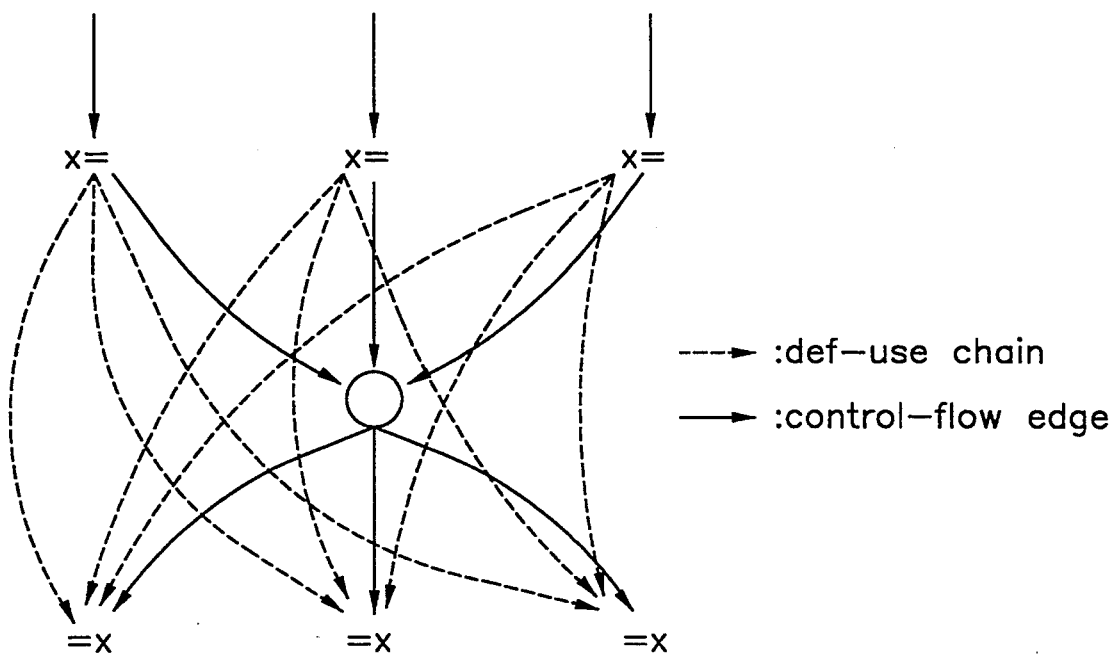
FIG. 3a shows an example of the quadratic nature of using def-use chains.
Figure 3B:
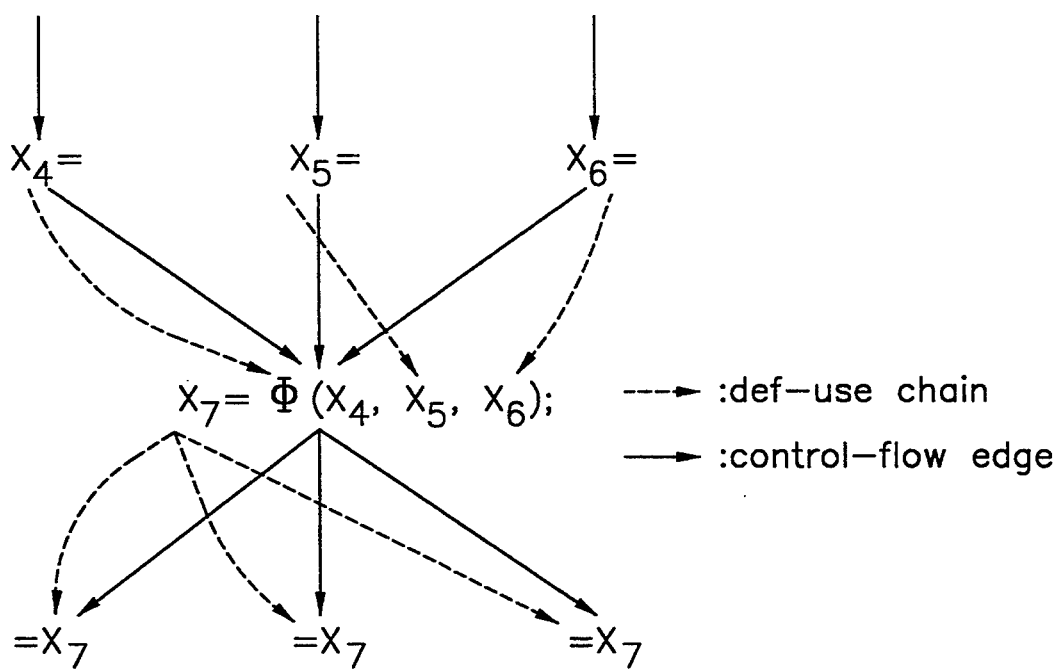
FIG. 3b shows an example of how SSA reduces the number of def-use chains with $\phi$-functions.
Figure 6A:
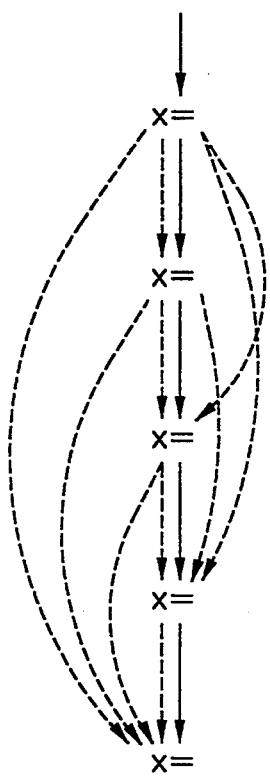
FIG. 6a shows an example of how preserving definitions cause quadratic growth in the size of data flow information.
Figure 6B:
FIG. 6b shows how the present invention would model the same information shown in FIG. 6a more compactly by linearizing definitions.

Traditionally, optimization problems are solved using data flow chains (def-def, def-use, and use-def chains). As mentioned above, the number of data flow chains can easily grow quadratically with the number of defs and uses in the program due to preserving (i.e., non-killing) definitions of arrays, of aliased variables, and at subroutine calls as shown in FIG. 6a and large number of paths in the control flow graph as shown in FIG. 3a. FIG. 6b shows an example of how the present invention would eliminate a number of redundant data flow chains.

Figure 7:
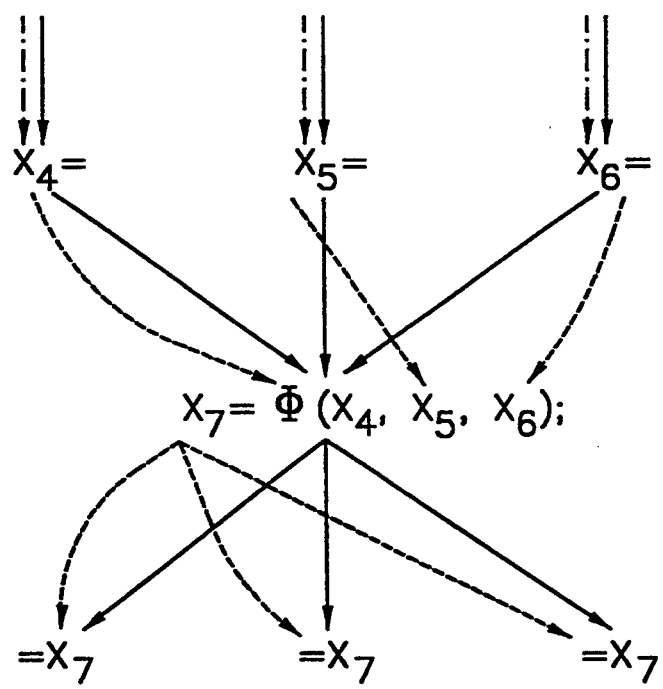
FIG. 7 shows how the present invention would model compactly the data flow information of a program by combining the linearization of preserving definitions with an SSA-like $\phi$-function.

By combining the linearization of preserving defs with SSA-like $\phi$-functions, as shown in FIG. 7, a compact data flow representation has a variety of advantages over conventional approaches. The number of edges in the compact data flow representation is at most linear to the number of defs and uses in a program. The data flow information is propagated directly from the node which generates it to the nodes which use it. Information is combined as early as possible. Moreover, the compact data flow representation of data flow chains does not require modification of program text, unlike SSA form. Finally, the def-use, def-def, use-def, and use-use information is implicitly represented by the linearization of preserving defs and φ-functions, and is explicitly collected on demand when solving data flow problems.

Figure 8:
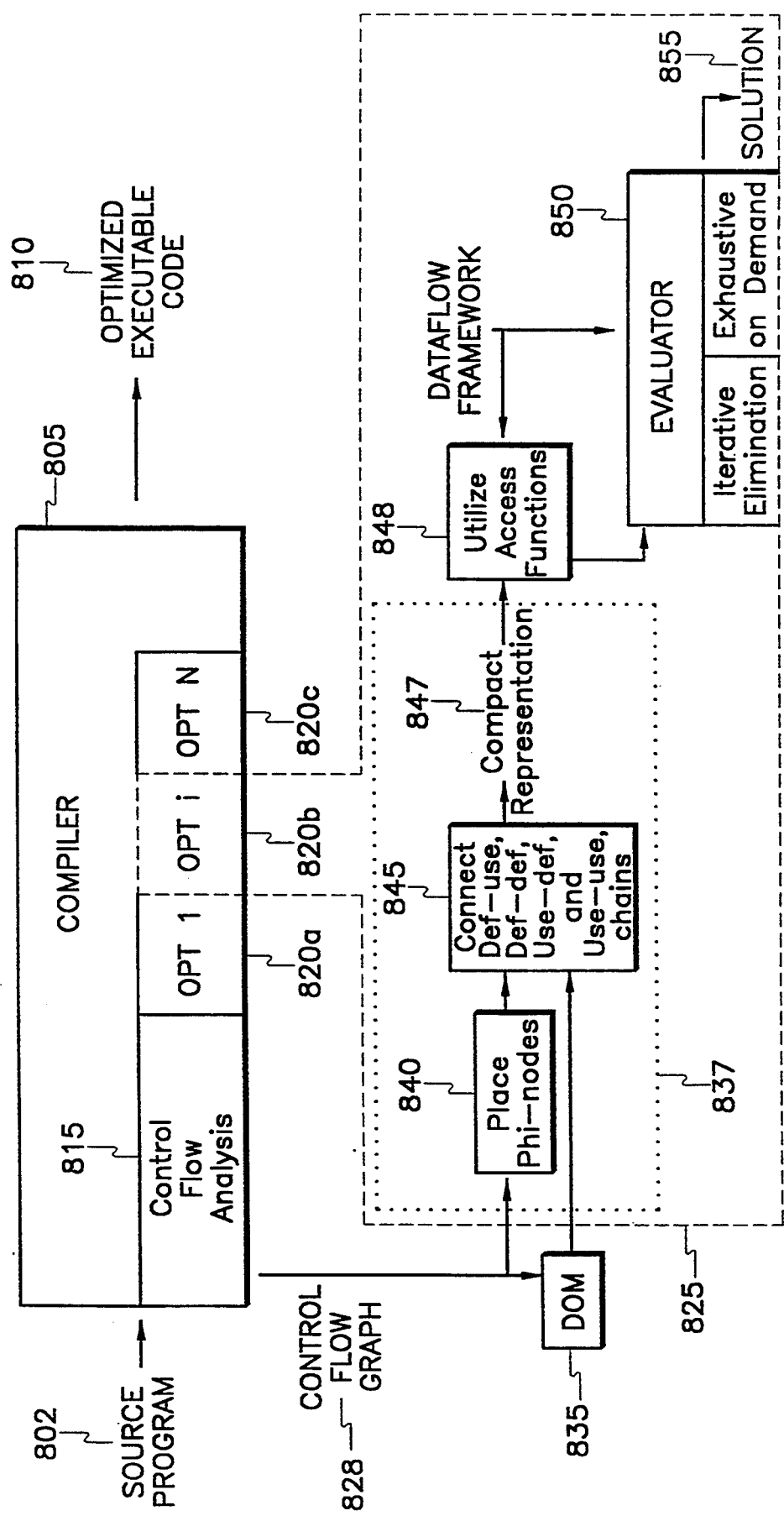
FIG. 8 shows a high level representation of the preferred embodiment of the present invention.
Figure 9A:
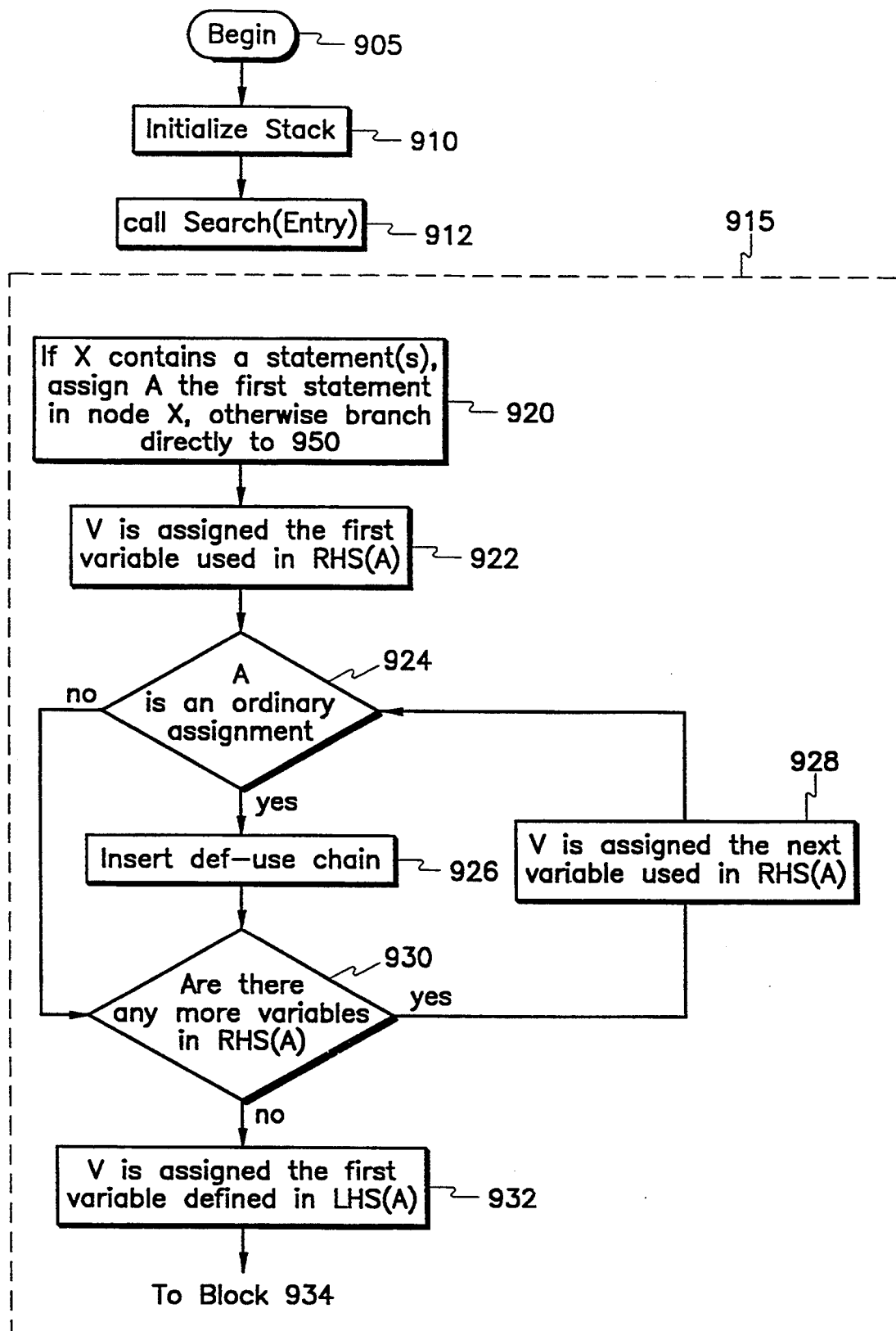
FIGS. 9a, 9b, 9c, and 9d are flowcharts outlining the method of constructing a compact data flow representation of def-use and def-def chains.
Figure 9B:
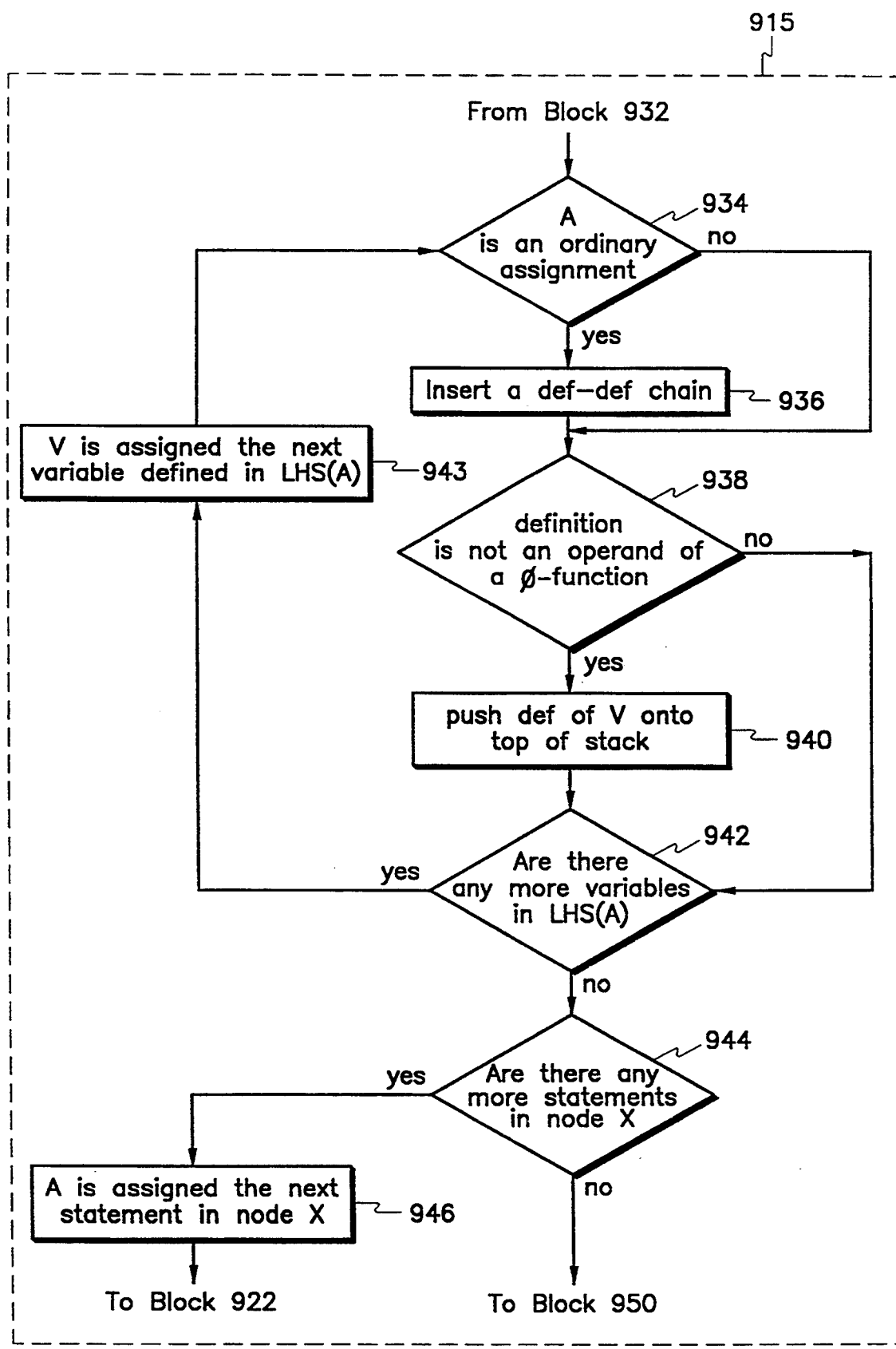
Figure 9C:
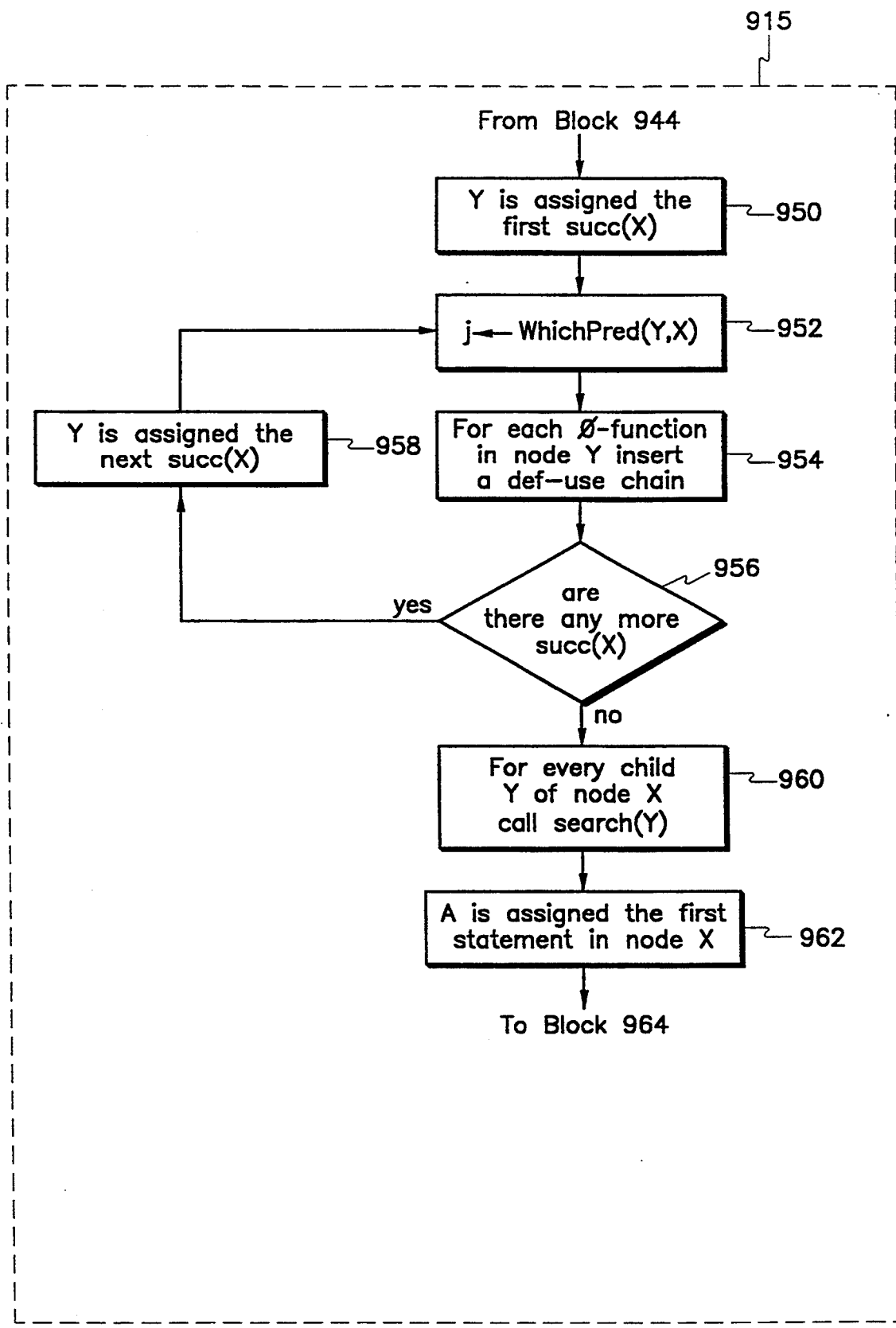
Figure 9D:
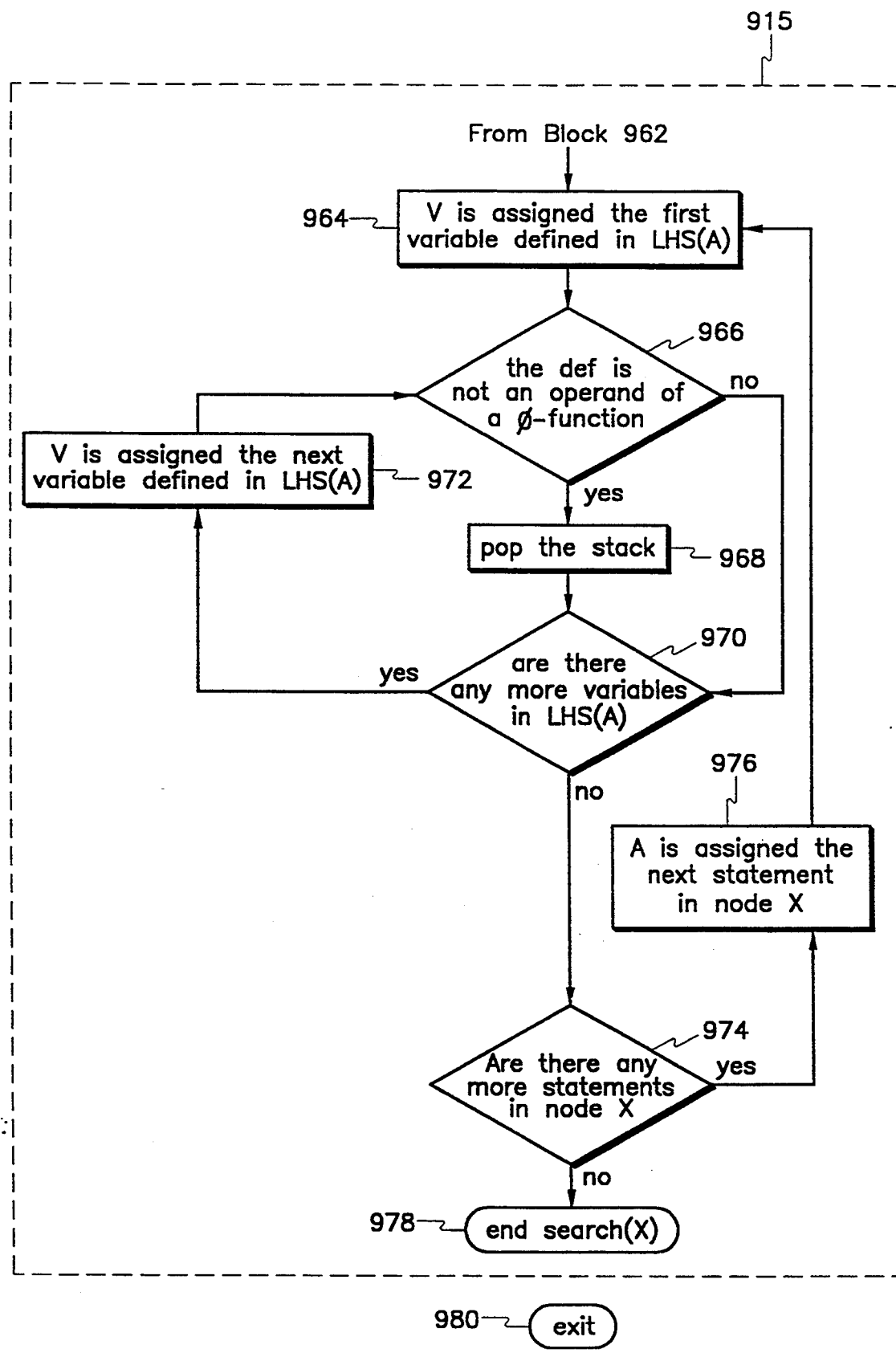
Figure 10A:
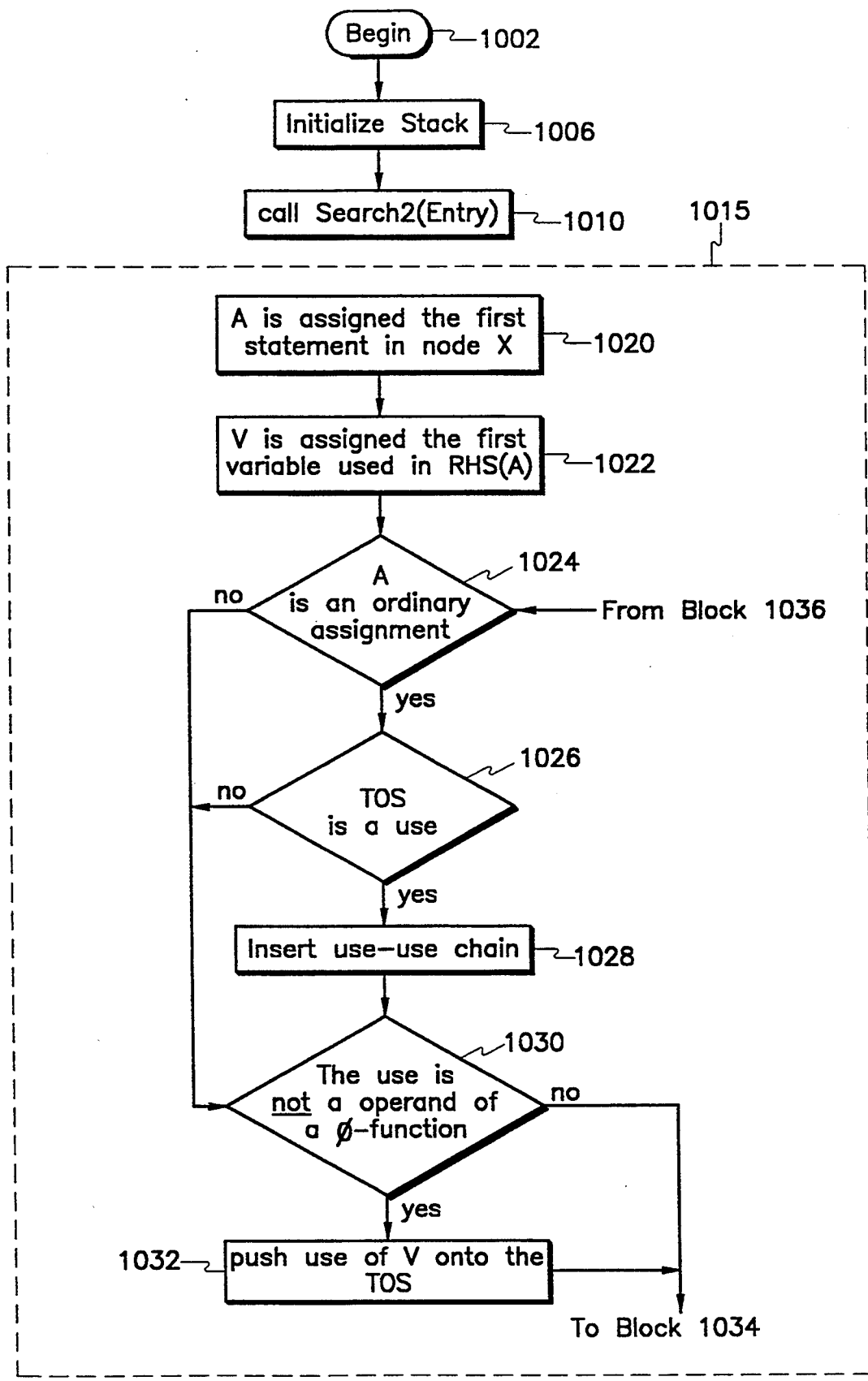
FIGS. 10a, 10b, 10c, 10d, 10e, and 10f are flowcharts outlining the method of constructing a compact data flow representation of use-use and use-def chains.
Figure 10B:
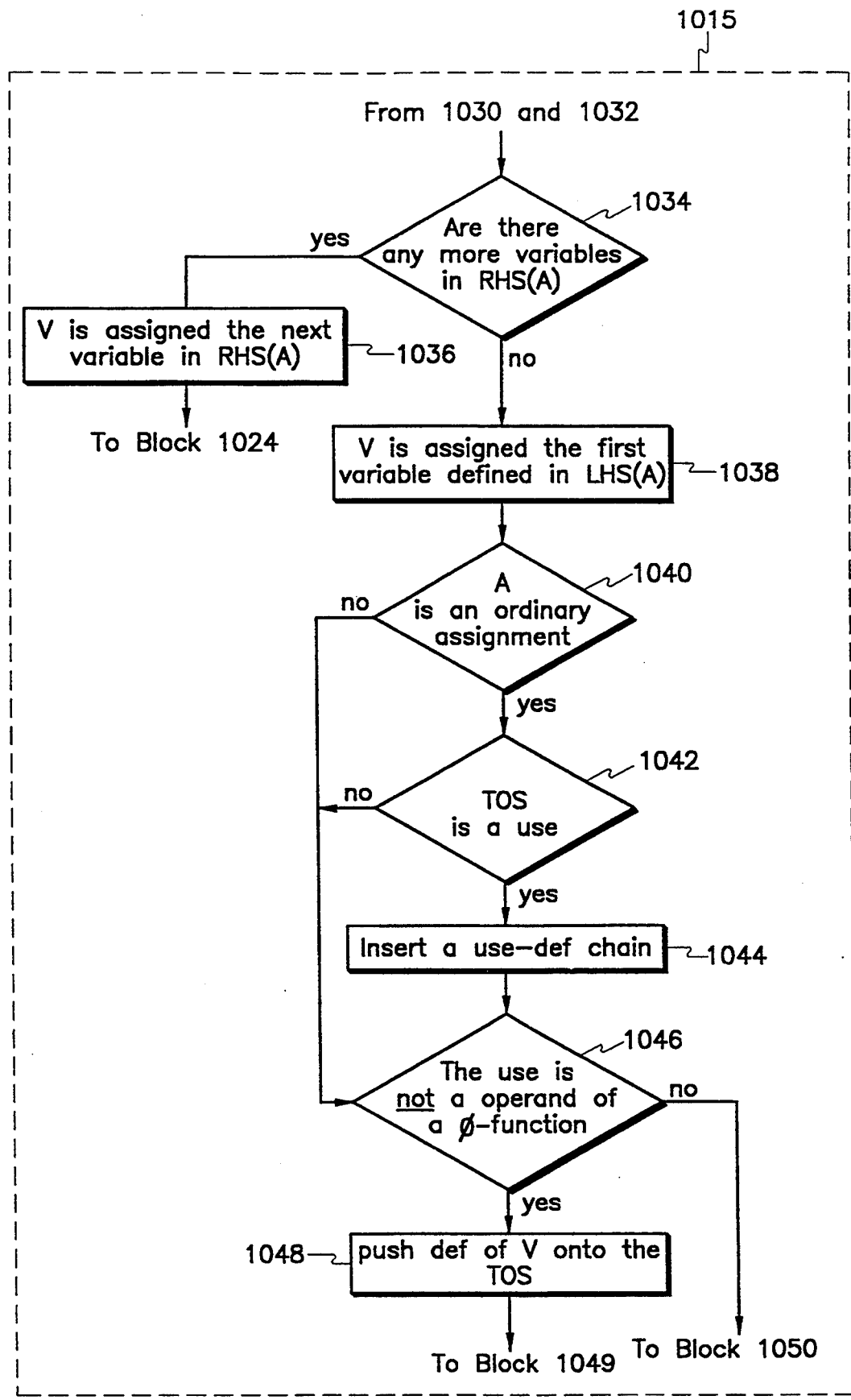
Figure 10C:
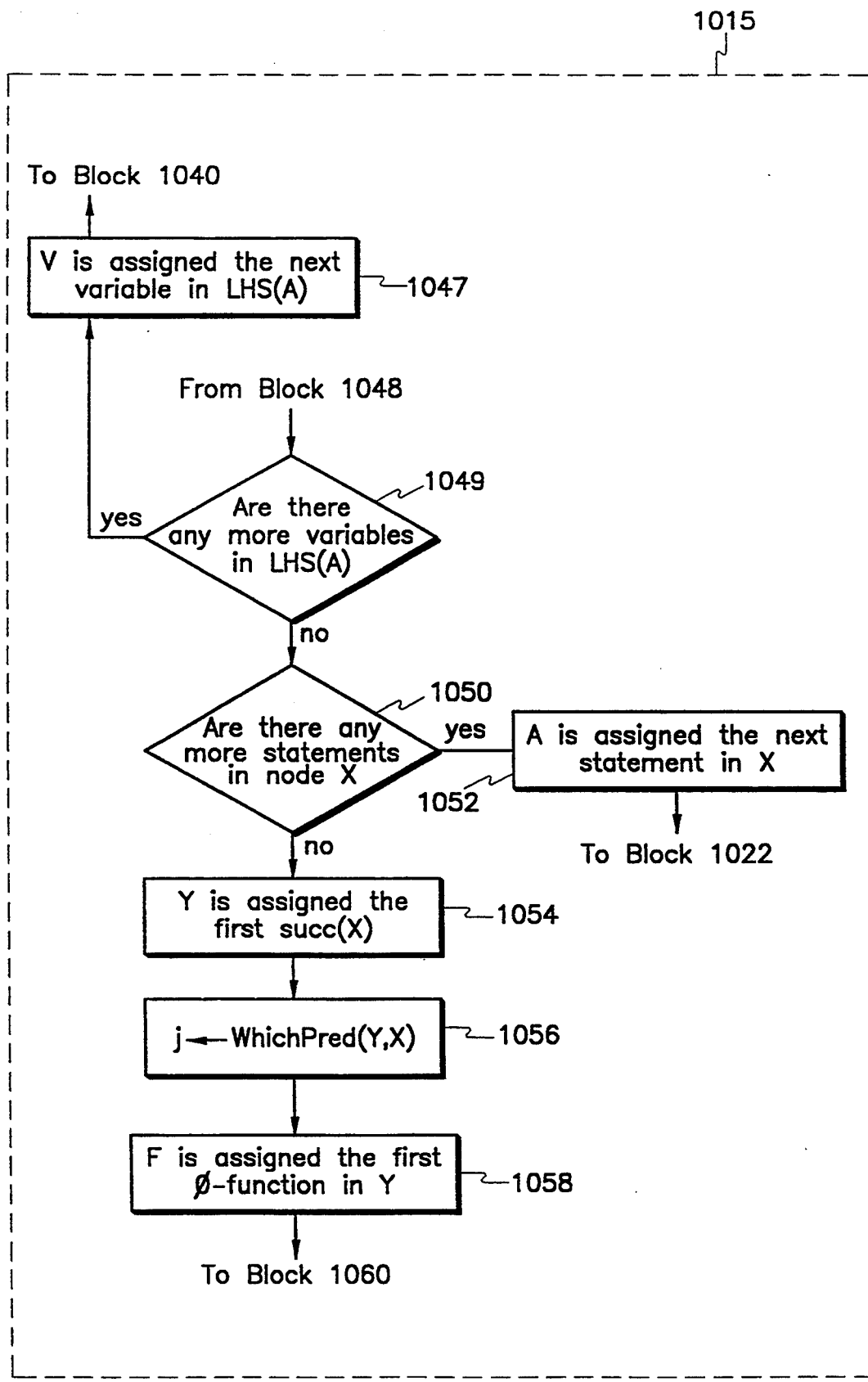
Figure 10D:
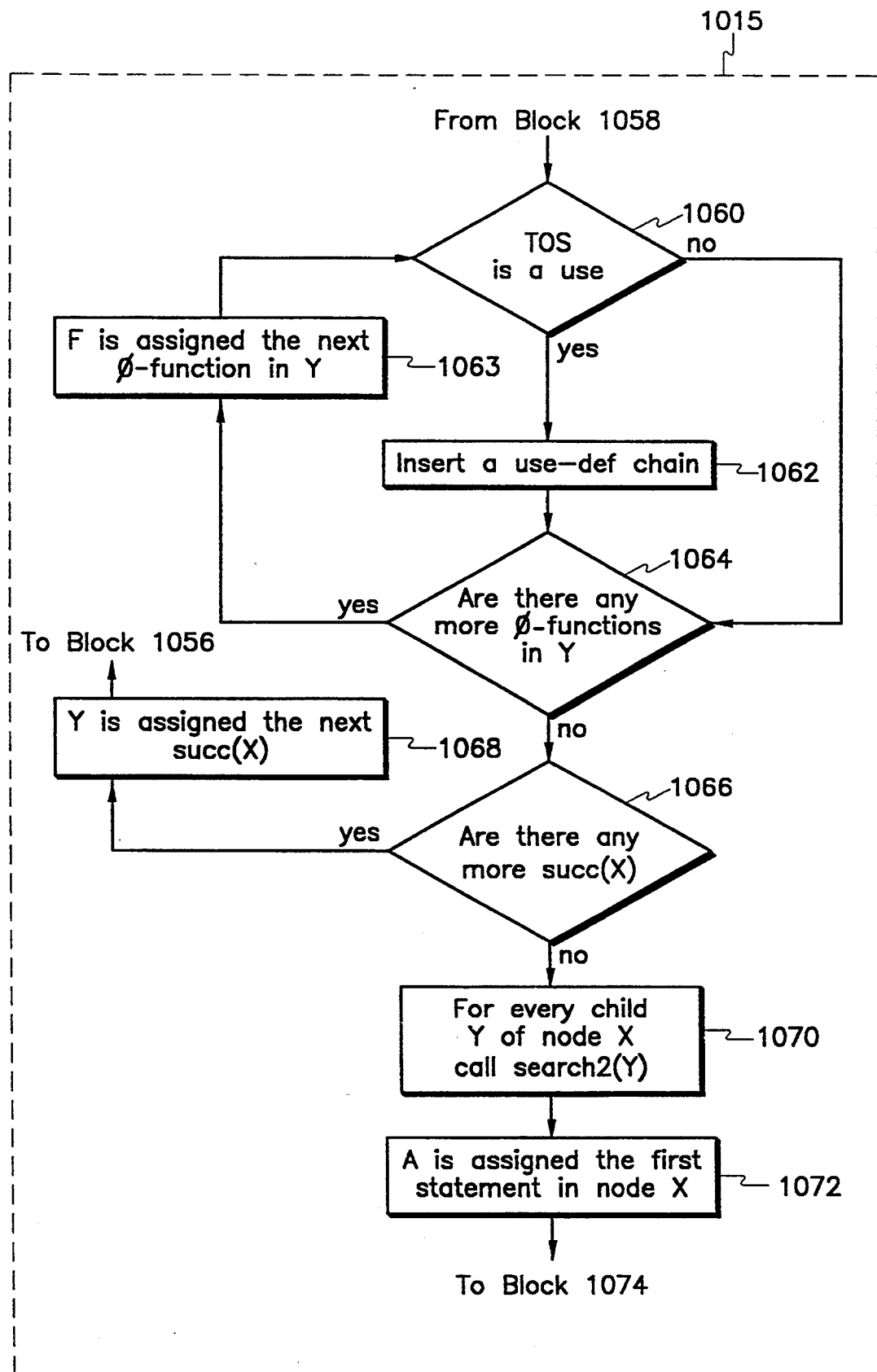
Figure 10E:
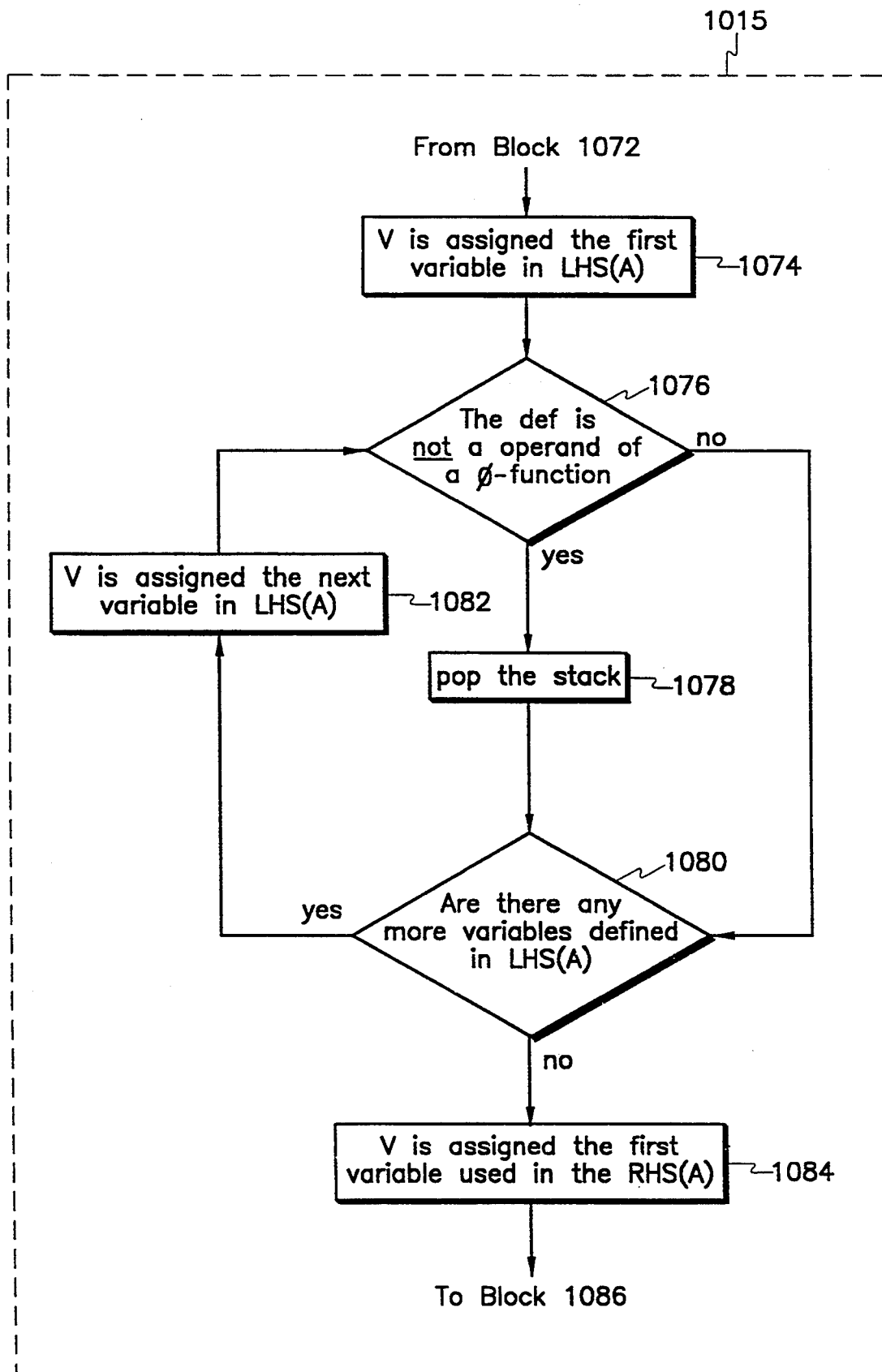
Figure 10F:
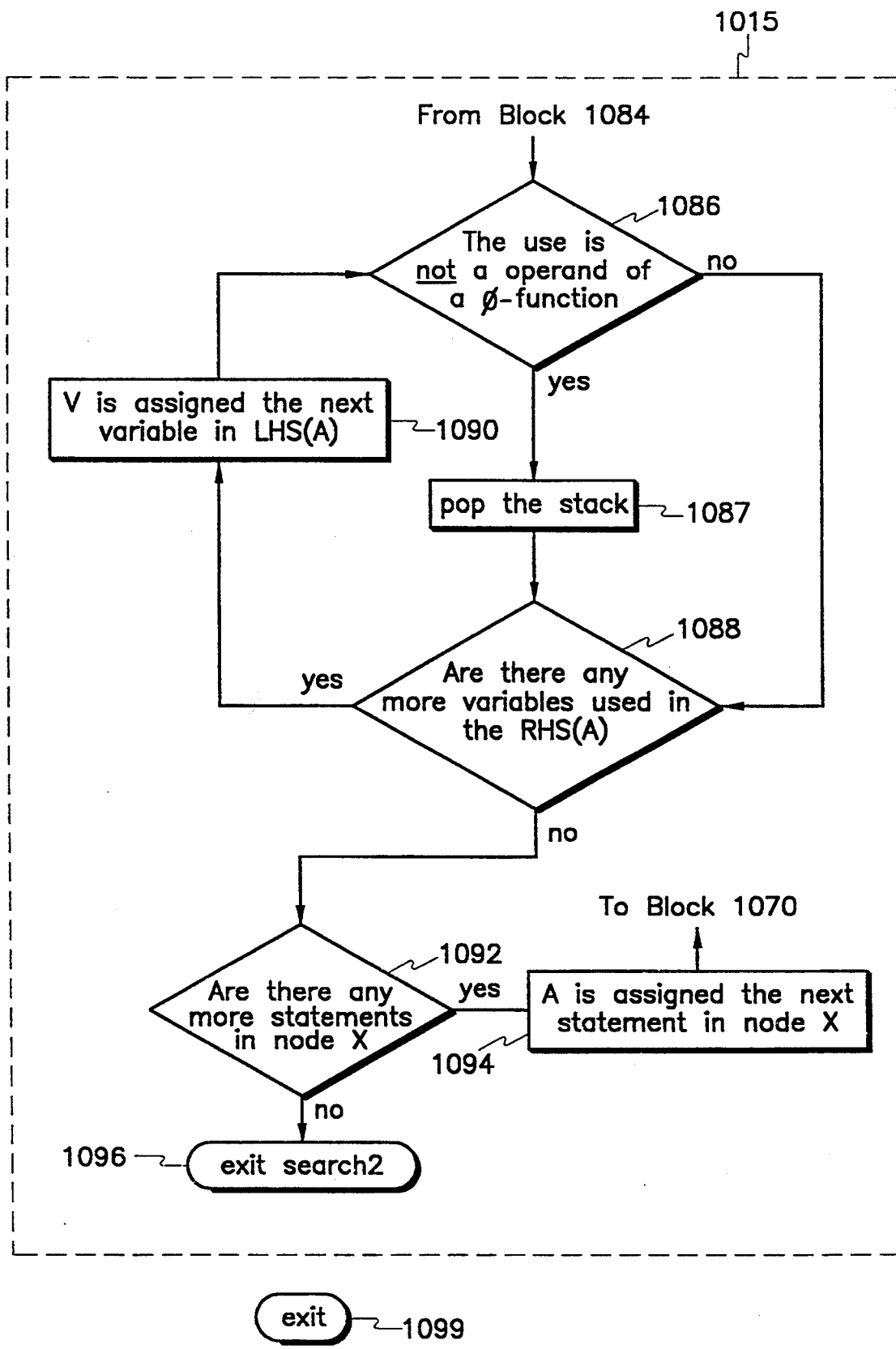

The preferred embodiment of the present invention is shown generally in FIG. 8. A source program 802 enters a compiler 805 and is, through a series of steps, converted into optimized executable code 810. The source program 802 is converted into a control flow graph (CFG) 828 by the control flow analysis block 815. The compiler 805 can be divided into a number of different optimizations 820a, 820b, and 820c.

The CFG 828 acts as an input into the optimization procedure 825. The CFG 828 is first input into DOM 835 which constructs a dominator tree, which in turn determines the dominance frontier for the CFG 828. These components are then used to construct the compact data flow representation.

The first aspect of constructing the compact data flow representation is to place the φ-nodes (i.e., φ-unctions) as shown in block 840. The next step as shown in block 845 is to connect the data flow chains (i.e., def-use, def-def, use-def and/or use-use chains). The chains are connected with reference to the φ-functions and the output from DOM 835. Once the chains are connected, the compact representation 847 is complete.

As discussed below, the compact data flow representation is then used to efficiently compute a number of commonly used data flow problems. This is accomplished by utilizing a variety of access functions. A data flow framework defines the data flow problem to be solved. A description of the data flow framework is an input to the evaluation of the solution. The data flow framework is concerned with data flow problems that can be solved by solving the following four chains: def-def, def-use, use-def, and use-use. The access functions that compute the sets of these chains is described in detail in section III(C).

The complete compact representation can then be evaluated with respect to the data flow framework to solve a variety of data flow problems, which in turn produces a final solution 855 to the optimization problem. However, the final solution 855 need not be a complete solution to the data flow problem. Frequently, a complete solution is not necessary or preferred and the present invention is designed to allow one skilled in the art to evaluate the compact data flow representation with respect to very narrow queries. Consequently, the present invention contemplates using the compact data flow representation to produce a partial solution to the data flow problem. The preferred embodiment of the present invention is implemented in the PL/1 computer language. However, one skilled in the art could use any computer language to implement the present invention.

A. Placement of the φ-functions

Once again, the concepts discussed below can be found in Cytron I and/or Cytron II.

Most programs have branch and join nodes. At the join nodes, a special form of assignment called a φ-function is added. FIG. 7 illustrates how the operands to the φ-function indicate which assignments to X reach the join point. Subsequent uses of X become uses of $X_7$. The old variable X has been replaced by new variables $X_1$, $X_2$, $X_3$, ..., and each use of $X_i$ is reached by just one assignment to $X_i$. Indeed, there is only one assignment to $V_i$ in the entire program. This simplifies the record keeping for several optimizations.

Generally, the placement of φ-functions requires examining the dominance frontier of each node in the control flow graph. Suppose that a variable V has just one assignment in the original program, so that any use of V will be either a use of the value $V_0$ at entry to the program or a use of the value $V_1$ from the most recent execution of the assignment to V. Let X be the basic block of code that assigns to V, so X will determine the value of V when control flows along any edge X→Y, the code in Y will see $V_1$ and be unaffected by $V_0$. If Y≠X, but all paths to Y must still go through X (in which case X is said to strictly dominate Y), then the code in Y will always see $V_1$. Indeed, any node strictly dominated by X will always see $V_1$, no matter how far from X it may be. Eventually, however, control may be able to reach a node Z not strictly dominated by X. Suppose Z is the first such node on a path, so that Z sees $V_1$ along one inedge but may see $V_0$ along another inedge. Then Z is said to be in the dominance frontier of X and is clearly in need of a φ-function for V. In general, no matter how assignments to V may appear in the original program and no matter how complex the control flow may be, we can place φ-functions for V by finding the dominance frontier of every node that assigns to V, then the dominance frontier of every node where a φ-function has already been placed, and so on.

Translating a program into SSA form is a two-step process. In the first step, some trivial φ(V,V, ...) are inserted at some of the join nodes in the program's control flow graph. In the present invention, the first step of inserting φ-functions will be accomplished by inserting entries in set of tables, which will be described in more detail in section III(B). In the second step of translating a program into SSA form, new variables $V_i$ (for i—0,1,2, ...) are generated. However, the compact data flow representation of the present invention does not require the second step. As mentioned above, there is no renaming of program text.

An assignment statement may be either an ordinary assignment or a φ-function. A φ-function at entrance to a node X has the form V→(R,S, ...), where V,R,S, ... are variables. The number of operands R,S, ... is the number of control flow predecessors of X. The predecessors of X are listed in some arbitrary fixed order, and the j-th operand of φ is associated with the j-th predecessor. If control reaches X from its j-th predecessor, then the run-time support remembers j while executing the φ-functions in X. The value of φ-function uses only one of the operands, but which one depends on the flow of control just before entering X. Any φ-functions in X are executed before the ordinary statements in X. Some variants of φ-functions as defined here are useful for special purposes. For example, each φ-function can be tagged with the node X where it appears. When the control flow of a language is suitably restricted, each φ-function can be tagged with information about conditionals or loops.

We start by stating more formally the nonrecursive characterization of where the φ-functions should be located. Given a set $\mathcal{L}$ of CFG nodes, the set $J(\mathcal{L})$ of join nodes is defined to be the set of all nodes Z such that there are two nonnull CFG paths that start at two distinct nodes in $\mathcal{L}$ and converge at Z. The iterated join $J+(\mathcal{L})$ is the limit of the increasing sequence of sets of codes $$J_1 = J(\mathcal{L}) \quad (4)$$

$$J_{i+1} = J(\mathcal{L} \cup J_i) \quad (5)$$

In particular, if $\mathcal{L}$ happens to be the set of assignment nodes for a variable V, then $J^+(\mathcal{L})$ is the set of $\phi$-function nodes for V.

The join and integrated join operations map sets of nodes to sets of nodes. We extend the dominance frontier mapping from nodes to sets of nodes in the natural way:

$$DF(\mathcal{L}) = \bigcup_{X \in \mathcal{L}} DF(X) \quad (6)$$

As with join, the iterated dominance frontier $DF^+(\mathcal{L})$ is performed by the efficient work list algorithm in Table 11; the formulation here is convenient for relating iterated dominance frontiers to iterated joins. If the set $\mathcal{L}$ is the set of assignment nodes for a variable V, then it can be shown that $$J^+(\mathcal{L}) = DF^+(\mathcal{L}) \quad (7)$$

(this equation depends on the fact that Entry is in $\mathcal{L}$), and hence, that the location of the $\phi$-function for V can be computed by the work list algorithm for computing $DF^+(\mathcal{L})$ that is given in TABLE 2. The set of nodes that need $\phi$-functions for any variable V is the iterated dominance frontier $DF^+(\mathcal{L})$, where $\mathcal{L}$ is the set of nodes with assignment to V.

TABLE 2

```
IterCount ← 0
for each node X do
    HasAlready(X) ← 0
    Work(X) ← 0
end
W ← ∅
for each variable V do
    IterCount ← IterCount + 1
    for each X ∈ A(V) do
        Work(X) ← IterCount
        W ← W ∪ {X}
    end
    while W ≠ ∅ do
        take X from W
        for each Y ∈ DF(X) do
            if HasAlready(Y) < IterCount
                then do
                    place <V ← φ(V, ..., V)> at Y
                    HasAlready(Y) ← IterCount
                    if Work(Y) < IterCount
                        then do
                            Work(Y) ← IterCount
                            W ← W ∪ {Y}
                        end
                end
        end
    end
end
```

The procedure in Table 2 inserts trivial $\phi$-functions. The outer loop of this algorithm is performed once for each variable V in the program. Several data structures are used. W is the work list of CFG nodes being processed. In each iteration of this algorithm, W is initialized to the set A(V) of nodes that contains assignments to V. Each node X in the work list ensures that each node Y in DF(X) receives a $\phi$-function. Each iteration terminates when the work list becomes empty. Work(*) is an array of flags, one flag for each node, where Work(X) indicates whether X has ever been added to W during the current iteration of the outer loop. HasAlready(*) is an array of flags, one for each node, where HasAlready(X) indicates whether a $\phi$-function for V has already been inserted at X.

The flags Work(X) and HasAlready(X) are independent. We need two flags because the property of assigning to V is independent of the property of needing a $\phi$-function for V. The flags could have been implemented with just the values true and false, but this would require additional record keeping to reset any true flags between iterations, without the expense of looping over all the nodes. It is simpler to devote an integer to each flag and to test flags by comparing them with the current iteration count.

B. Connecting the Data Flow Chains

Connecting the data flow chains is achieved by constructing a data structure which includes an AllDef table and an AllUse table. The AllDef table has information for every definition site in the program and the AllUse table has information for every use in the program. The two data structures contain the original definitions and uses of the program (i.e., the original assignments) and the placed $\phi$-functions. The present invention creates new definitions and uses at the $\phi$-functions. The entries of the two tables form the necessary components that form the compact data flow representation of the data flow chains.

The two data structures contain pointers to each other; besides these, other pointers into these data structures include: NodeDef(n) and NodeUse(n). NodeDef(n) is an index into AllDef, representing the head of a list of variables defined at node n and NodeUse(n) is an index into AllUse, representing the head of a list of variables used at node n. Both pointers are equal in size to an array with the same amount of elements as there are nodes in the CFG being optimized.

First consider the AllDef structure for a given definition site d that defines variable v. The structure of AllDef is shown in TABLE 3. The individual elements of AllDef are described below.

TABLE 3

| structure | type |
| --- | --- |
| var | integer |
| varNext | integer |
| pres | bit(1) aligned |
| aliasD | bit(1) aligned |
| node | integer |
| next | integer |
| xv | integer |
| offset | longinteger |
| extent | longinteger |
| num | integer |
| rdef | integer |
| phirhs | integer |
| phiarity | integer |
| uchild | integer |
| dchild | integer |
| dsib | integer |
| stakptr | integer |
| ruse | integer |
| udsib | integer |
| arc | integer |
| rhs | integer |

Variable (var) is a DICTIONARY pointer for v, where DICTIONARY is a symbol table containing a collection of all the names and variables in a program. VarNext constructs a linked list of entries with the same var field. Offset is the offset from v of the definition d. This field is used for data dependence testing. Extent is the number of bytes in memory affected by the definition. This also is used by data dependence.

Preserve (pres) is TRUE if d is not a "kill" of v. That is, if the old value of v might persist after the definition site is executed, then pres is TRUE; otherwise, pres is FALSE. AliasD is TRUE if d is defined because of an alias relationship. An alias relationship exists if two or more expressions use the same memory address. Node is the node containing d. Next is either zero (0) or points to the next definition site for the same node. For example, programs are partitioned into nodes, and each node has at least one statement from the program contained therein. If X is defined in the node and Y is defined in the same node, then Next would point from X to Y.

XV is either zero or an EXPRESSION VECTOR pointer to the reference (in the program) causing the definition. In other words, xv is a way of linking the source program and a particular entry in the table.

Num is the SSA number assigned to the definition. In practice, this number is either: (1) AllDef(d).node (this notation, which is used throughout this document, represents, for example, the node number associated with the definition of d) if this definition site is the last definition within the node for v, or (2) zero, which means the definition occurs within AllDef(d).node, but is not the final definition of v within the node. In other words, this definition should not be seen by other nodes.

Rdef is either zero or an index into AllDef of the (unique) definition that reaches site d. Uchild is an index into AllUse of the first use reached by d. Dchild is an index into AllDef of the first definition reached by d. Dsibling is an index into AllDef of the next definition reached by a def as d is reached. Phi right hand side (phirhs) is an index into AllUse of the first argument of the $\phi$-function, if d is the target of a $\phi$-function. Otherwise, this field is zero. Phiarity is the arity of the $\phi$-function (i.e., how many variables are there in the $\phi$-function), if d is the target of the $\phi$-function. Otherwise, this field is zero. For example, $\phi(X,X,X)$ has a phiarity of three.

Stakptr is used to implement the pushing and popping operation of variables at each node. Stakptr form an ordered linked list of entries of the same variable.

Ruse is either zero or an index into AllUse of the (unique) use that reaches site d. Udsib is an index in AllDef of the next definition reached by a use as d is reached. Rhs is an index into AllUse of the $\phi$-function of which d is a parameter. Finally, arc is the control flow arc causing this def to be an argument of a $\phi$-function if d occurs in a $\phi$-function. Otherwise, this field is zero.

Now consider the AllUse structure in some detail, for a given use site u that uses variable v. The structure of AllUse is shown in TABLE 4. Note that the AllDef table and the AllUse table have data structures with the same name (for example, rdef). The data structures that make up the two tables, however, have values that are completely independent of one another.

TABLE 4

| structure | type |
|---|---|
| var | integer |
| varNext | integer |
| node | integer |
| next | integer |
| xv | integer |
| offset | longinteger |
| extent | longinteger |
| num | integer |

TABLE 4-continued

| structure | type |
|---|---|
| rdef | integer |
| usib | integer |
| lhs | integer |
| arc | integer |
| ruse | integer |
| uusib | integer |
| philhs | integer |
| phiarity | integer |
| uchild | integer |
| dchild | integer |

Variable is a DICTIONARY pointer for v. VarNext constructs a linked list of entries with the same var field. Offset is the offset from v of the use u. This field is used for data dependence testing. Extent is the number of bytes referenced by the use. This also is used by data dependence.

Xv is either zero or an EXPRESSION VECTOR pointer to the reference (in the program) causing the use. Node is the node containing u. Next is either zero or points to the next use site for the same node. Num is the SSA number assigned to the definition. In practice, this number is either: (1) the node containing the (unique) definition reaching u, or (2) zero (0), which means that the use is reached by a $\phi$-function within the same node.

Rdef is either 0 or an index into AllDef of the (unique) definition that reaches use u. Usib is an index into AllUse of the next use reached by a definition as u is reached. Left Hand Side (lhs) is an index into AllDef of the definition at node AllUse(u).node (which represents the node number associated with use u) computed using u. For example in $X_1=\phi(X_2,X_3,X_4)$, for each X inside the parenthesis there is an entry in the AllUse table. Lhs provides a pointer from the variables on the right hand side of the equation $(X_2,X_3,X_4)$, back to the variable on the left hand side $(X_1)$. If u occurs in a $\phi$-function, then arc is the control flow arc causing this use to be an argument of a $\phi$-function. In other words, each of the uses contained within the parenthesis of the $\phi$-function correspond to some edge that resulted in arrival at that node. Arc distinguishes the different edges that are inputs into the node. Otherwise, arc is zero.

Ruse is either zero or an index into AllUse of the (unique) use that reaches site u. Uusib is an index in AllUse of the next use reached by a use as u is reached. Philhs (analogous to phirhs of the AllDef table) is an index into AllDef of the first argument of the $\phi$-function. Otherwise, this field is zero. Uchild is an index in AllUse of the first use reached by u. Finally, dchild is an index in AllDef of the first def reached by u.

TABLES 3 and 4 present the structures found in the preferred embodiment of the AllDef table and AllUse table, respectfully. However, one skilled in the art could readily construct other data structures to be entered into the AllDef and AllUse tables.

The procedure for constructing the AllDef Table and the AllUse table (i.e., the compact data flow representation) is shown in TABLE 5 and TABLE 6. TABLE 5 shows the procedure for constructing the compact data flow representation of def-use and def-def chains, while TABLE 6 shows the procedure for constructing the compact data flow representation of use-use and use-def chains. The two procedures are essentially analogous, and thus only the procedure shown in TABLE 5 will be described in detail. However, the major differences in TABLE 6 will be described.

TABLE 5

```
CONNECT:
    for each variable V do
        S(V)←EmptyStack;
    end
    call SEARCH(Entry)
end CONNECT
SEARCH(X):
    for each statement A in X do
        for each variable V used in RHS(A) do
            if A is an ordinary assignment then
                insert a def-use chain from
                    TOP(S(V)) to the use of V
        end
        for each variable V defined in LHS(A) do
            if A is an ordinary assignment then
                insert a def-def chain from
                    TOP(S(V)) to the def of V
                if the definition is not an operand of
                    a φ-function then
                    push the def of V onto S(V)
        end
    end
    for each Y ∈ Succ(X) do
        j ← WhichPred (Y,X)
        for each φ-function F in Y do
            insert a def-use chain from TOP(S(V))
                to the j-th operand V in RHS(F)
        end
    end
    for each Y ∈ Children(X) do
        call SEARCH(Y)
    end
    for each statement A in X do
        for each variable V defined in LHS(A) do
            if the definition is not an operand of
                a φ-function then
                pop S(V)
        end
    end
end SEARCH
```

FIGS. 9a, 9b, 9c, and 9d are flowcharts representing the procedure shown in TABLE 5. The procedure 900 for constructing a compact data flow representation of def-use and def-def chains begins after the CFG has been constructed, the φ-functions have been placed, and the dominator tree has been generated.

The compiler and/or optimizer then sends a signal to begin procedure 900. A stack is initialized in block 910, and in block 912 the SEARCH(X) procedure 915 is called. The SEARCH procedure traverses the dominator tree from top to bottom. Consequently, the search procedure 915 is initially called with X being equal to Entry, since the Entry node is the first node in the dominator tree.

Block 920 determines whether there are any statements in X, and if there are then block 920 assigns the first statement in X to variable A. Generally, a node in a CFG might have as few as one statement to as many as the compiler determines are necessary for suitable assignment of nodes in the CFG. However, Entry will not typically have any statements. If block 920 determines that there are no statements in X, then it branches directly to block 950. For simplicity, block 920 is the only non-decisional block that contains a reference in the flowchart to a direct branch to another block. The discussion below makes clear when a direct branch from a non-decisional block is made.

Next, in block 922 search procedure 915 determines whether there are any variables in the Right Hand Side (RHS) of statement A. If there are, then block 922 assigns the first variable in RHS of statement A to variable V. Otherwise, the search procedure branches directly to block 932 (as noted above, block 922 makes no reference of this branch). Next, the search procedure 915 determines in block 924 whether statement A is an ordinary assignment (i.e., not a φ-function), and if not, then the search procedure 915 flows directly to block 930. However, if statement A is an ordinary assignment, then the search procedure 915 proceeds to block 926. Block 926 inserts a def-use chain from the definition found on the top of the stack to each variable V used in the right hand side (RHS) of statement A. Block 930 asks whether there are any more variables in the RHS of statement A, and if not, then proceed to block 932. However, if there are more variables in the RHS of statement A, then tlock 928 assigns the next variable used in the RHS of statement A to V, and the above sequence starts again at block 924.

The search procedure 915 then proceeds to block 932, where it is determined whether there are any variables in the Left Hand Side (LHS) of A. If there are, then V is assigned the first variable in the LHS of statement A. Otherwise, procedure 915 branches directly to 944. Block 934 determines whether statement A is an ordinary assignment, and if not, then the search procedure 915 proceeds to block 938. However, if A is an ordinary assignment, a def-def chain is inserted by block 936 from the definition found on the top of the stack to the first variable V in the left hand side (LHS) of statement A. Block 940 pushes the definition of V onto the top of the stack if the definition is not an operand of any φ-functions in the CFG. Block 942 determining whether there are any other variables in the LHS of statement A, and if not, then search procedure 915 proceeds to block 944. However, if there are more variables in the LHS of statement A then block 943 assigns V the next variable in the LHS of statement A, and the loop starting with block 934 begins again.

Next, search procedure 915 proceeds to block 944, which determines whether there are any more statements in node X, and if not, then procedure 915 proceeds to block 950. However, if there are more statements in node X then block 946 assigns the next statement in node X to A and begins the above-described loop starting at block 922 all over again.

Blocks 950 through 956 are repeated for all successor nodes of X (initially Entry). Of course, if there are no successors of X, then procedure 915 branches directly to block 960. Block 950 assigns variable Y the first successor node of X. Block 952 assigns an integer to j, where j delineates which predecessor of X in the CFG is Y. The search procedure 915 proceeds to block 954, where for each φ-function F in successor node Y a def-use chain is inserted from the top of the stack to the j-th operand V in the RHS of F. Block 956 determines whether there are any more successors of X, and if there are no more successors, then search procedure 915 proceeds to block 960. Otherwise, block 958 assigns Y the next successor of X and the loop starting at 952 begins again.

Search procedure 915 then proceeds to block 960 where a recursive procedure begins. For every child Y of X (initially set at Entry), the search procedure 915 makes a recursive procedure call. The search procedure 915 traverses through the dominator tree until there are no more children of X. The operand of the recursive call is equal to the particular child Y of X in the dominator tree that is currently being operated on by the search procedure 915.

Once there are no more successors of X, the search procedure 915 proceeds to block 962. Block 962 determines whether there are any statements in node X, and if there are, then block 962 assigns A the first statement in node X. Otherwise, procedure 915 branches directly to block 978.

Block 964 determines whether there are any variables in the LHS of A, and if there are then block 962 assigns variable V the first variable defined in the LHS of statement A. Otherwise, procedure 915 branches directly to block 974. Block 966 determines whether the definition V is an operand of a $\phi$-function, and if it is then the search procedure 915 proceeds to block 970. However, if variable V is not an operand of a $\phi$-function, then the definition on the top of the stack is popped. The procedure 915 proceeds to 970 where it is determined if are any more variables in the LHS of statement A, and if there are, then the next variable V in the LHS of statement A is assigned to V and the sequence begins again at 966.

Once there are no more variables in the LHS of A, the search procedure 915 proceeds to block 974. Block 974 determines whether there are any more statements in node X. If there are more statements in node X, then block 976 assigns A the next statement in node X, and the loop starting at node 964 is initialed once again.

Once the above sequence (blocks 962 to 976) of popping all the definition from the top of the stack is completed, the search procedure 915 is completed and it returns to the main procedure 900 (or the search procedure 915 if it is in the middle of a recursive call). Finally, the main procedure 900 exits 980 and the compiler/optimizer continues with whatever current application it is concurrently working on.

As described above, the procedure 900 with the aid of search procedure 915, constructs a compact data flow representation of def-use and def-def chains. Search procedure 915 refers to "insert a def-def chain" and "insert a def-use chain" as part of its method of constructing the compact representation. However, these "chains" are only abstract concepts. The true chains are really connected through the use of the individual elements that make up the AllDef and AllUse tables. Every time a chain is inserted, the appropriate fields in the tables maintaining the chains are updated. The individual elements of the table are connected using commonly known procedures. Those skilled in the art of compiler design will be capable of connecting these chains. It is the compactness of the tables, as opposed to the plethora of unrelated and superfluous chains found in the previous methods, that make the present invention so effective. In addition, the present invention obtains this compact representation without the renaming or modification of any program text.

Referring to FIGS. 10a, 10b, 10c, 10d, 10e, and 10f the procedure 1000 for constructing a compact data flow representation of use-use and use-def chains is shown. Procedure 1000 is essentially analogous to procedure 900. However, there are some differences which are discussed below.

TABLE 6

```
CONNECT:
    for each variable V do
        S(V) ← EmptyStack;
    end
    call SEARCH2(Entry)
```

TABLE 6-continued

```
end CONNECT
SEARCH2(X)
    for each statement A in X do
        for each variable V used in RHS(A) do
            if A is an ordinary assignment then
                if TOP(S(V)) is a use then
                    insert a use-use chain from TOP(S(V))
                    to the use of V
                if the use is not an operand of a
                φ-function then
                    push the use of V onto S(V)
            end
        for each variable V defined in LHS(A) do
            if A is an ordinary assignment then
                if TOP(S(V)) is a use then
                    insert a use-def chain from TOP(S(V))
                    to the def of V
                if the definition is not an operand of a
                φ-function then
                    push the def of V onto S(V)
            end
    end
    for each Y ∈ Succ(X) do
        j ← WhichPred(Y,X)
            for each φ-function F in Y do
                if TOP(S(V)) is a use then
                    insert a use-def chain from TOP(S(V))
                    to the j-th operand V in LHS(F)
            end
    end
    for each Y ∈ Children(X) do
        call SEARCH2(Y)
    end
    for each statement A in X do
        for each variable V defined in LHS(A) do
            if the definition is not an operand of a
            φ-function then
                pop S(V)
        end
        for each variable V used in RHS(A) do
            if the use is not an operand of a
            φ-function then
                pop S(V)
        end
    end
end SEARCH2
```

As shown in TABLE 6 and block 1010, procedure 1000 calls SEARCH2(Entry) 1015. Blocks 1020 through 1024 are similar to blocks 920 through 924, respectively. Block 1026 checks to determine whether the variable on the TOS is a use, and if it is then a use-use chain is inserted from the TOS to the use of V at block 1028. Otherwise, the procedure 1015 proceeds directly to block 1030. Block 1030 checks to determine whether the use in the RHS(A) is an operand of a $\phi$-function, and if so, then block 1032 pushes the use of V onto the TOS. Otherwise, the procedure 1015 proceeds directly to block 1034.

Blocks 1034 through 1052 are similar to blocks 928 through 946, respectively. However, procedure 1015 adds block 1042. Block 1042 checks the variable on the TOS to determine whether it is a use, and if it is, then block 1044 of procedure 1015 inserts a use-def chain from the TOS to the def of V. In addition, block 1048 pushes the definition of V onto the TOS.

Blocks 1054 through 1064 are similar to blocks 950 through 958. However, block 954 is broken up into blocks 1060 through 1064. The key distinction is block 1060. Block 1060 checks the TOS to determine if the variable on the TOS is a use. Only if the TOS is a use is a use-def chain inserted from the TOS to the j-th operand V in the LHS(F), where F is a particular $\phi$-function in successor node Y.

Blocks 1070 through 1082 pops the stack for each variable defined in the LHS(A) that is not an operand of a $\phi$-function and blocks 1084 through 1090 pops the stack for each variables used in the RHS(A) that is not an operand of a $\phi$-function. Block 974 checks to determine if there are any more statements in Node X, and if there are then the process described above is repeated starting with block 1070.

C. Access Functions

Described below are the implementation details of a variety of procedures that efficiently compute the following data flow problems using the data structures given above: (1) the set of definitions that reach a given definition, (2) the set of definitions that reach a given use, (3) the set of definitions that are reached by a given definition; (4) the set of uses that are reached by a given definition, (5) the set of uses that reach a given definition, (6) the set of definitions that are reached by a given use, (7) the set of uses that reach a given use, and (8) the set of uses that are reached by a given use. These procedures have been aptly named access functions, since they allow the compiler/optimizer to utilize the compact data flow representation to access information that is often exploited while solving data flow problems.

When called by a specific application, the procedures visit only those AllDef and AllUse entries that serve the particular application, while applying an application-dependent procedure to each visited entry. This application-dependent procedure is provided by each particular application and called ApplyThisFtn (apply this function) in the following discussions. ApplyThisFtn represents a specific action the user wants performed on the information collected while developing the particular access function specified (i.e. delete an entry). After applied to an entry (AllDef or AllUse), ApplyThisFtn also returns a signal indicating whether to stop or continue visiting entries beyond that entry.

Two variables will be utilized extensively below: dOld and dNew. Consider the simplistic program shown in TABLE 7:

TABLE 7

| |
|---|
| S1: $A_1 \leftarrow B_1 + C$ |
| S2: $B_2 \leftarrow A_2 + B_3$ |
| S3: $A_3 \leftarrow A_4 + B_4$ |

Where the AllDef table has $A_1$, $B_2$, and $A_3$ as elements and the AllUse table has $B_1$, $C$, $A_2$, $B_3$, $A_4$, and $B_4$ as elements. The subscript numbers are only given for easy identification in the discussion below; as indicated above, program text does not need to be renamed. Reference will be made to this program in defining the use of dOld and dNew below. In addition, pseudo code will also be utilized below. For example AllDef[dOld].rdef represents the rdef field in the AllDef table associated with the variable located at index value dOld.

1. Definitions Reaching Definitions

Each definition site d that defines variable v has an entry in AllDef table described in the previous section. Given below is the method for determining the set of definitions that reach a given definition whose index value in the AllDef table is dOld. Referring to TABLE 7, the set of definitions that reach a given definition $A_3$ can be determined, where dOld would represent an index value into the AllDef table to definition $A_3$.

Each use site of variable v in this data structure is reached by at most one definition site of v. Likewise, each definition site in SSA form is reached by at most one definition. For definition site AllDef[dOld], AllDef[dOld].rdef or dNew is the index of the AllDef entry that reaches AllDef[dOld]. dNew would represent, in our example above, an index value into the AllDef table to definition $A_1$. AllDef[dNew] is one of the following three types: preserving, killing, or $\phi$-function.

In preserving, the set of definitions sites reaching AllDef[dNew] can also reach AllDef[dOld]; there might be a need, however, to recursively compute by following rdef chains, the set of definitions that reach AllDef[dNew] in order to compute the set of definitions that reach AllDef[dOld].

In the case of killing, no definitions sites reaching this entry can reach AllDef[dOld] via this path; we stop following the rdef chain along this path.

Finally, in the case of $\phi$-functions, the information of the definition sites reaching this entry is stored as the arguments of the $\phi$-function. Each argument of the $\phi$-function is regarded as a use site and is given an entry in AllUse table, whose rdef field points to the AllDef entry corresponding to that argument. Thus, we can compute the set of definition sites reaching this $\phi$-function entry by recursively following the rdef fields of the AllUse entries representing the arguments of the $\phi$-function. The arguments of each $\phi$-function entry are assigned contiguously in the AllUse table. The starting index is given in AllDef[dNew].phirhs, and the number of arguments is given in AllDef[dNew].phiarity.

Referring to TABLE 8, Subroutine VisitReachingDef shows the implementation of the steps described above. Visiting all the definition sites reaching AllDef[dOld] and applying procedure ApplyThisFtn to each of the visited definition sites can be done as follows:
if (AllDef[dOld].rdef<>0) then
   DefVisited[*]=0
   VisitReachingDef (AllDef [dOld].rdef, ApplyThisFtn); endif;

TABLE 8

```
VisitReachingDef(defIndex, ApplyThisFtn)
    int       defIndex;
    procedure ApplyThisFtn;
    If (DefVisited [defIndex] <>0) /*Already visited*/
        return
    else DefVisited[defIndex] = 1
    endif
    if (ApplyThisFtn(defIndex, DEF) == STOP)
        return;
    endif;
    if (AllDef[defIndex].pres == 1
        /* It's a preserving def. */
        if (AllDef[defIndex].rdef <> 0)
        VisitReachingDef(AllDef[defIndex].rdef,
            ApplyThisFtn);
        endif;
    elseif (AllDef[defIndex].phiarity <> 0)
        /* It's a phi function entry */
        int    useIndex;
        for useIndex =   AllDef[defIndex].phirhs to
                         AllDef[defIndex].phirhs +
                         AllDef[defIndex].phiarity −1
            if (AllUse[useIndex].rdef <> 0)
            VisitReachingDef(AllUse[useIndex].rdef,
                ApplyThisFtn);
            endif;
        endfor;
    else
        /* regular killing def. */
    endif;
end VisitReachingDef;
```

2. Definitions Reaching a Use

Determining definition sites reaching a use site is the same as computing definition sites reaching a definition site. However, the rdef field of AllUse entry is used instead of rdef field of AllDef entry. Thus, visiting all the definition sites reaching a use site of index uOld (AllUse[uOld]) and applying procedure ApplyThisFtn to each of the visited definition sites can be done as follows:
if (AllUse[uOld].rdef <> 0) then
   DefVisited[*]=0
   VisitReachingDef(AllUse[uOld].rdef, ApplyThisFtn); endif;

3. Definitions Reached by a Definition

AllDef entries reached by a same AllDef entry (e.g., AllDef[dOld]) have the same rdef value and form a linked list via the dsib field. The first node of such a linked list is pointed to by the AllDef[dOld].child. Thus we can visit all the definition sites reached by AllDef[dOld], except those reached via $\phi$-functions, by first following AllDef[dOld].dchild to the first node of the linked list and then following the dsib fields of the nodes in the linked list. Referring to TABLE 7, the set of definitions that are reached by a given definition $A_1$ can be determined, where dOld would represent an index value into the AllDef table to definition $A_1$.

If the AllDef entry (e.g., AllDef[dNew]) located by following AllDef[dOld].dchild is a preserving definition site, all the definition sites reached by AllDef[dNew] are also reached by AllDef[dOld]; it might be necessary to recursively compute the AllDef entries reached by AllDef[dNew] to compute the entries reached by AllDef[dOld]. In our example above, dNew would be an index value into the AllDef table to As.

An AllUse entry reached by AllDef[dOld] can be a use representing an argument of a $\phi$-function. In this case AllDef entries reached by the $\phi$-function definition site are also reached by AllDef[dOld]. Thus, to determine the AllDef entries reached by AllDef[dOld], we also need to check if any AllUse entry reached by AllDef[dOld] is an argument of a $\phi$-function, which can be done by looking at the arc field of the AllUse entry. An AllUse with a non-zero arc field is an argument of a $\phi$-function, whose AllDef index is stored in the lhs field of the AllUse entry. If we need to continue visiting AllDef entries reached via $\phi$-function definition, we can do that by using the AllDef index of the $\phi$-function, which is given in the lhs field of the AllUse entry.

Subroutines VisitReachedDef and VisitDefViaPhi in TABLE 10 and 11 show the implementation of the steps described above. Visiting all the definition sites reached by AllDef[dOld] and applying procedure ApplyThisFtn to each of the visited definition sites can be done as follows:
DefVisited[*]=0;
VisitDef(dOld, ApplyThisFtn);
where VisitDef is shown in TABLE 9.

TABLE 9

```
procedure VisitDef(dOld, ApplyThisFtn)
    int         dOld;
    procedure   ApplyThisFtn;
    if (AllDefpdOld].dchild <> 0) then
        VisitReachedDef(AllDef[dOld].dchild,
            ApplyThisFtn);
    endif;
    if (AllDef[dOld].uchild <> 0) then
        VisitDefViaPhi(AllDef[dOld].uchild,
            ApplyThisFtn);
    endif;
```

TABLE 9-continued

```
end VisitDef;
```

TABLE 10

```
procedure VisitReachedDef(defIndex, ApplyThisFtn)
    int         defIndex;
    procedure   ApplyThisFtn;
    if (DefVisited[defIndex] <> 0
                /*already visited*/
        return;
    else DefVisited[defIndex] = 1;
    endif;
    if (ApplyThisFtn(defIndex, DEF) == STOP)
        return;
    endif;
    if (AllDef[defIndex].pres == 1)
        /* It's a preserving def */
        VisitDef(defIndex, ApplyThisFtn);
    elseif (AllDef[defIndex].phiarity <> 0)
        /* φ-function entry */
        VisitDef(defIndex, ApplyThisFtn);
    endif;
    if (AllDef[defIndex].dsib <> 0)
    VisitReachedDef(AllDef[defIndex].dsib,
        ApplyThisFtn);
    endif;
end VisitReachedDef;
```

TABLE 11

```
procedure VisitDefViaPhi(useIndex, ApplyThisFtn)
    int         useIndex;
    procedure   ApplyThisFtn;
    if (AllUse[useIndex].arc <> 0)
        /* It's a φ-function argument. */
        VisitReachedDef(AllUse[useIndex].lhs,
            ApplyThisFtn);
    endif;
    if (AllUse[useIndex].usib <> 0)
        VisitDefViaPhi(AllUse[useIndex].usib,
            ApplyThisFtn);
    endif;
end VisitDefViaPhi.
```

4. Uses Reached by a Definition

Determining use sites reached by a definition site is very similar to computing definition sites reached by a definition site. Subroutines VisitReachedUse and VisitUseViaDef shown in TABLES 13 and 14 show how to determine uses reached by a definition. Visiting all the use sites reached by AllDef[dOld] and applying procedure ApplyThisFtn to each of the visited use sites can be done as follows: VisitUse(dOld, ApplyThisFtn), where VisitUse is shown in TABLE 12.

TABLE 12

```
procedure VisitUse(dOld, ApplyThisFtn)
    int         dOld;
    procedure   ApplyThisFtn;
    if (AllDef[dOld].uchild <> 0) then
        VisitReachedUse(AllDef[dOld].uchild,
            ApplyThisFtn);
    endif;
    if (AllDef[dOld].dchild <> 0) then
        VisitUseViaDef(AllDef[dOld].dchild,
            ApplyThisFtn);
    endif;
end VisitUse;
```

TABLE 13

```
procedure VisitReachedUse(useIndex, ApplyThisFtn)
    int         useIndex;
    procedure   ApplyThisFtn;
    if (UseVisited[useIndex] <> 0
            /*Already visited*/
```

TABLE 13-continued

```
        return;
    else UseVisited[useIndex] = 1;
    endif
    if (ApplyThisFtn(useIndex, USE) == STOP)
        return;
    endif;
    if (AllUse[useIndex].arc <> 0)
        /* It's a φfunction argument. */
        VisitUseViaDef(AllUse[useIndex].lhs,
            ApplyThisFtn);
    endif;
    if (AllUse[useIndex].usib <> 0)
        VisitReachedUse(AllUse[useIndex].usib,
            ApplyThisFtn);
    endif;
end VisitReachedUse;
```

TABLE 14

```
procedure VisitUseViaDef(defIndex, ApplyThisFtn)
    int        defIndex;
    procedure  ApplyThisFtn;
    if (AllDef[defIndex].pres == 1)
        /* It's a preserving def. */
        VisitUse(defIndex, ApplyThisFtn);
    elseif (AllDef[defIndex].phiarity <> 0)
        /* φ-function entry */
        VisitUse(defIndex, ApplyThisFtn);
    endif;
    if (AllDef[defIndex].dsib <> 0)
        VisitUseViaDef(AllDef[defIndex].dsib,
ApplyThisFtn);
    endif;
end VisitUseViaDef;
```

5. Uses Reaching a Definition

Each use site u that uses a variable V has an entry in the AllUse structure as described above. Given below is the method for determining the set of uses that reach a given definition whose index value in the AllDef structure is dOld. Referring to TABLE 7, the set of uses that reach a given definition A₃ can be determined, where dOld would represent an index value into the AllDef table to definition A₃.

Each definition site of variable V in our data structure is reached by at most one use site of V. For definition site AllDef[dOld], AllDef[dOld].ruse or uNew is the index of AllUse entry that reaches AllDef[dOld]. Uses reaching AllUse[uNew] should be counted in the set of uses reaching AllDef[dOld] by using the mechanism to compute the set of uses reaching a use, which will be described below.

As described before AllDef[dOld] is reached by at most one definition site whose index is AllDef[dOld], rdef or dNew. AllDef[dNew] is one of the following three types: preserving, killing, or φ-function. In killing, no use sites reaching AllDef[dNew] can reach AllDef[dOld] via this path; thus, we stop following the ruse chain along this path. In the case of preserving, uses reaching AllDef[dNew] can reach AllDef[dOld] along the path, and we keep following the ruse chain.

Finally, a definition which is a φ-function is not reached by a use site or a definition site; instead, the information of the definition sites reaching this entry is stored as the arguments of the φ-function. As described before in describing how to determine the set of definitions that reach a given definition, given an AllDef entry that is a φ-function, we can identify the definition sites whose information is stored as the arguments of the φ-function. Once those definition sites are identified, we regard each of those definition sites as AllDef[dNew] and apply to these AllDef entries the method described above that determines uses reaching AllDef[dOld] via AllDef[dNew].

Subroutine VisitReachingUD in TABLE 15 shows the implementation of the steps described above. Visiting uses reaching a def whose AllDef table index is defIndex can be done as following:

UseVisit[*]=0
VisitReachingUD(defIndex, ApplyThisFtn);

TABLE 15

```
procedure VisitReachingUD(defIndex, ApplyThisFtn)
    if (AllDef[defIndex].ruse <> 0)
        ReachingUse(AllDef[defIndex].ruse,
            ApplyThisFtn);
    elseif (AllDef[defIndex].rdef <> 0)
        int newDef;
        newDef = AllDef[defIndex].rdef;
        if ((AllDef[newDef].pres ==1) or
            (AllDef[newDef].phiarity <> 0))
            VisitReachingUD(newDef, ApplyThisFtn);
        endif;
    elseif (AllDef[defIndex].phiarity <> 0)
        int phiPara;
        for phiPara = AllDef[defIndex].phirhs to
                AllDef[defIndex].phirhs +
                AllDef[defIndex].phiarity −1
            if (AllUse[phiPara].rdef <> 0)
                int newDef;
                newDef = AllUse[phiPara].rdef;
                if ((AllDef[newDef].pres ==1) or
                    (AllDef[newDef].phiarity <> 0))
                    VisitReachingUD(newDef,
                        ApplyThisFtn);
                endif;
            endif;
        endfor;
    endif;
end VisitReachingUD;
```

6. Uses Reaching a Use

Determining uses reaching a use can be done similarly to determining uses reaching a definition. The only difference is that you start from an AllUse entry, rather than an AllDef entry. Thus, visiting all the use sites reaching a use site of index useIndex and applying procedure ApplyThisFtn can be done, using subroutine VisitReachingUU in TABLE 16 and ReachingUse in TABLE 17, as follows:

UseVisited[*]=0;
VisitReachingUU(useIndex,ApplyThisFtn);

TABLE 16

```
procedure VisitReachingUU (useIndex, ApplyThisFtn)
    if (AllUse[useIndex].ruse<> 0)
        ReachingUse(AllUse[useIndex].ruse,
            ApplyThisFtn)
    elseif (AllUse[useIndex].rdef <> 0)
        int newDef;
        newDef = AllUse[useIndex].rdef;
        if ((AllDef[newDef].press ==1) or
            (AllDef[newDef].phiarity <> 0))
            VisitReachingUD(newDef, ApplyThisFtn);
        endif;
    elseif (AllUse[useIndex].phiarity <> 0)
        int phiPara;
        for phiPara = Alluse[useIndex].philhs to
                AllUse[useIndex].philhs +
                AllUse[useIndex].phiarity −1
            if (AllDef[phiPara].ruse <> 0)
                ReachingUse(AllDef[phiPara].ruse,
                    ApplyThisFtn);
            endif;
        endfor;
    endif;
end VisitReachingUU;
```

TABLE 17

```
procedure ReachingUse(useIndex,ApplyThisFtn)
    if (UseVisited[useIndex]==1)/* already visited */
        return;
    endif;
    UseVisited[useIndex] = 1;
    if (ApplyThisFtn (useIndex, USE) == STOP)
        return;
    endif;
    VisitReachingUU (useIndex, ApplyThisFtn);
end ReachingUse;
```

7. Uses Reached by a Use AllUse entries reached by a same AllUse entry (e.g., AllUse[uOld]) have the same ruse value and form a linked list via the uusib field. The first node of such a linked list is pointed to by AllUse[uOld].uchild. Thus, we can visit all the use sites reached by AllUse[uOld] (e.g., AllUse[uNew]), except those reached via definition sites, by first following AllUse[uOld].uchild to the first node of the linked list and then following the uusib fields of the nodes in the linked list. Referring TABLE 7, the set of uses that are reached by a given use $A_2$ can be determined, where uOld would represent an index value into the AllUse table to use $A_2$.

Uses reached by the AllUse entry (e.g., AllUse[uNew]) located by following uchild and uusib can also reach AllUse [uOld]. Thus, we recursively determine AllUse entries reached by AllUse[uNew] as the uses reached by AllUse[uOld].

The AllDef entry reached by AllUse[uOld] (e.g., AllDef[dOld]) can be preserving. In this case, all the use sites reached by AllDef[dOld] (e.g., AllDef[uOld]) and can be determined by the mechanism to determine the use sites reached by a definition site, which will be described shortly.

The AllDef entry reached by AllUse[uOld] can be a definition representing an argument of a $\phi$-function. In this case, AllUse sites reached by the $\phi$-function use site are also reached by AllUse[uOld]. Thus, to determine the AllUse entries reached by AllUse[uOld], we also need to check if any AllDef entry reached by AllUse[uOld] is an argument of a $\phi$-function, which can be done by looking at the arc field of the AllDef entry. An AllDef with a non-zero arc field is an argument of a $\phi$-function, whose AllUse index is stored in the rhs field of the AllDef entry. Determining AllUse entries reached via $\phi$-function use can be done by using that AllUse index of the $\phi$-function.

Subroutines VisitReachedUU in TABLE 18, ReachedUse in TABLE 19, and VisitUse in TABLE 12 show the implementation of the steps described above. Visiting uses reached by a use whose AllUse table index is useIndex can be done as following:

UseVisited[*]=0;
VisitReachedUU (useIndex, ApplyThisFtn);

TABLE 18

```
procedure VisitReachedUU (useIndex, ApplyThisFtn)
    int newUse, newDef;
    newUse = AllUse[useIndex].uchild;
    while (newUse <> 0)
        ReachedUse(newUse, ApplyThisFtn);
        newUse = AllUse[newUse].uusib;
    endwhile;
    newDef = AllUse[useIndex].dchild;
    while (newDef <> 0)
        if ((AllDef[newDef].pres <> 0) or
           (AllDef[newDef].arc <> 0))
            VisitUse(newDef,ApplyThisFtn);
        endif;
```

TABLE 18-continued

```
        newDef = AllDef[newDef].udsib;
    endwhile;
end VisitReachedUU;
```

TABLE 19

```
procedure ReachedUse(useIndex, ApplyThisFtn)
    if (UseVisited[useIndex] == 1)/* already visited*/
        return;
    endif;
    UseVisited[useIndex] = 1;
    if (ApplyThisFtn (useIndex, USE) == STOP)
        return;
    endif;
    VisitReachedUU (useIndex, ApplyThisFtn);
end ReachingUse;
```

8. Definitions Reached by a Use

Determining definitions reached by a use can be done similarly to determining uses reached by a definition. The major difference is that we look for definitions, not uses.

First, definitions reached by an AllUse entry (e.g., AllUse[uNew]) that is reached by AllUse[uOld] are also reached by AllUse[uOld]. Thus, we first visit all the AllUse entries reached by AllUse[uOld] (e.g., AllUse[uNew]) and determine definitions reached by AllUse[uNew]. Second, definitions that are reached by AllUse[uOld], and are either preserving or $\phi$-function arguments, are identified because AllDef entries reached by these definitions are also reached by AllUse[uOld].

Subroutines VisitReachedUD in TABLE 20, ReachedDef in TABLE 21, and VisitDef in TABLE 9 show the implementation of the steps described above. Visiting definitions reached by a use whose AllUse table index is useIndex can be done as following:

DefVisited[*]=0;
VisitReachedUD(useIndex,ApplyThisFtn);

TABLE 20

```
procedure VisitReachedUD (useIndex, ApplyThisFtn)
    int newUse, newDef;
    newUse = AllUse[useIndex].uchild;
    while (newUse <> 0)
        VisitReachedUD(newUse, ApplyThisFtn);
        newUse = AllUse[newUse].uusib;
    endwhile;
    newDef = AllUse[useIndex].dchild;
    while (newDef <> 0)
        if (AllDef[newDef].arc <> 0)
            VisitReachedUD(AllDef[newDef].rhs,
              ApplyThisFtn);
        else
            ReachedDef(newDef, ApplyThisFtn);
        endif;
        newDef = AllDef[newDef].udsib;
    endwhile;
end VisitReachedUD;
```

TABLE 21

```
procedure ReachedDef(defIndex, ApplyThisFtn)
    if (DefVisited[defIndex]==1) /*already visited*/
        return;
    endif;
    DefVisited[defIndex] = 1;
    if (ApplyThisFtn (defIndex, DEF) == STOP)
        return;
    endif;
    if ((AllDef[defIndex].pres <> 0) or
       (AllDef[defIndex].phiarity <> 0))
        VisitDef(defIndex, ApplyThisFtn);
    endif;
```

TABLE 21-continued end ReachedDef;

IV. EXAMPLE

Figure 11A:
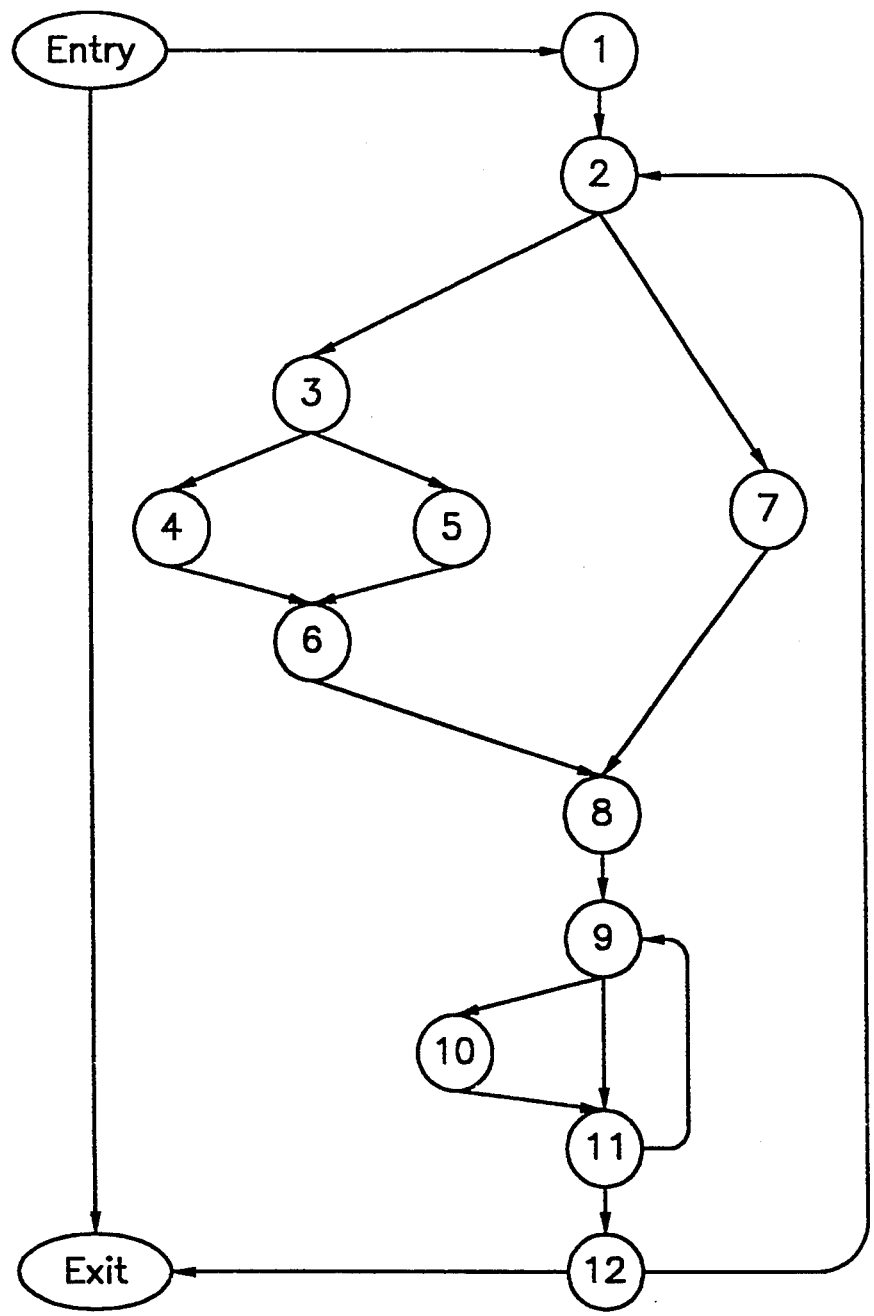
FIG. 11a shows a CFG for the program shown in TABLE 22.
Figure 11B:
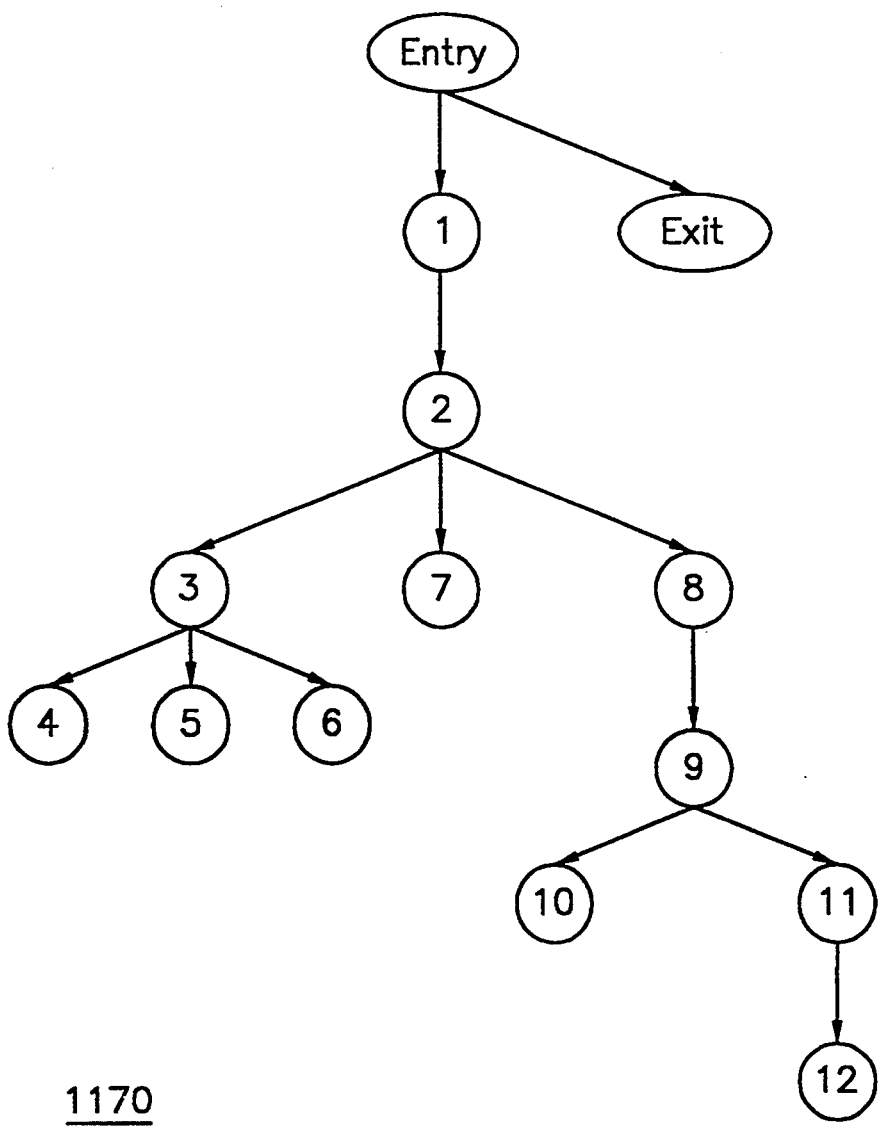

Referring to FIGS. 11a and 11b, a control flow graph (CFG) 1140 is shown for the sample computer program shown in TABLE 22. Each node in CFG 1140 represents a specific block of computer code. Each line of the computer program has been annotated with the corresponding node from the CFG 1140 shown in parenthesis. A dominator tree 1170 for CFG 1140 is shown in FIG. 11b.

TABLE 22

| | |
|---|---|
| I ← 1 | (1) |
| J ← 1 | (1) |
| K ← 1 | (1) |
| L ← 1 | (1) |
| repeat | (2) |
|   if (P) | (2) |
|     then do | (3) |
|       J ← 1 | (3) |
|       if (Q) | (3) |
|         then L ← 2 | (4) |
|         else L ← 3 | (5) |
|       K ← K + 1 | (6) |
|     end | (6) |
|     else K ← K + 2 | (7) |
|   print (I,J,K,L) | (8) |
|   repeat | (9) |
|     if (R) | (9) |
|       then L ← L + 4 | (10) |
|   until (S) | (11) |
|   I ← I + 6 | (12) |
| until (T) | (12) |

An example is given below of constructing the compact data flow representation of the present invention, and then using this representation to solve a given data flow problem. Although each variable in the computer program shown in TABLE 22 has a corresponding compact data flow representation, the example below will only construct the compact data flow representation for the variable K.

In the example, there are three places where K is defined (nodes 1, 6 and 7) and three places where it is used (nodes 6, 7, and 8). The symbols $D_i^j$ and $U_i^j$ are used to distinguish each def and use. For example, $D_i^j$ ($U_i^j$) means the def (use) of K at node j whose AllDef (AllUse) table index is i. Thus, the def at node 1 will be denoted as $D_1^1$, the def at node 6 as $D_2^6$, and the def at node 7 as $D_3^7$. The use at node 6 will be denoted as $U_1^6$, the use at node 7 as $U_2^7$, and the use at node 8 as $U_3^8$. A field, for example XYZ, of a def (use) $D_i^j$ will be denoted as $XYZ(D_i^j)$. For example, the var field of $D_1^1$ will be expressed as $var(D_1^1)$. The var field of each def and use will contain the proper index to the DICTIONARY table for variable K. The offset and extent will be 0 and 4 (assuming the size of K is 4 bytes long), respectively. All the other fields will be initialized to 0 at this point.

The procedure in Table 2 is applied to the definitions, and two $\phi$-definitions are derived, one at node 2 ($D_4^2$) and the other at node 8 ($D_5^8$). Each of the $\phi$-defs has two operands (i.e., uses), which will be denoted as $\hat{U}$. The "lhs" field of the two parameters of $D_4^2$ ($\hat{U}_6^2$ and $\hat{U}_7^2$) will have 4 as their value, and the "lhs" field of the two parameters of $D_5^8$ ($\hat{U}_8^8$ and $\hat{U}_9^8$) will have 5 as their value (i.e., $lhs(\hat{U}_6^2) = lhs(\hat{U}_7^2) = 4$ (i.e., $D_4^2$); $lhs(\hat{U}_8^8) = lhs(\hat{U}_9^8) = 5$ (i.e., $D_5^8$)). Also, $phirhs(D_4^2) = 6$ (i.e., $\hat{U}_6^2$), $phiarity(D_4^2) = 2$ (i.e., two parameters), $phirhs(D_5^8) = 8$ (i.e., $\hat{U}_8^8$), $phiarity(D_5^8) = 2$ (i.e., two parameters). The "arc" field of each parameter ($\hat{U}$) will contain the proper value. For example, $arc(\hat{U}_6^2)$ will contain the number of the edge from node 1 to node 2 and $arc(\hat{U}_7^2)$ will contain the number of the edge from node 12 to node 2.

Applying the procedure in TABLE 2 to the uses ($U_1^6$ and $U_2^7$), we will get two $\phi$-uses one at node 2 ($U_4^2$) and the other at node 8 ($U_5^8$). Each of the $\phi$-uses has two operands (defs), which will be denoted as $\hat{D}$. The "rhs" field of the two parameters of $U_4^2$ ($\hat{D}_6^2$ and $\hat{D}_7^2$) will have 4 as its values, and the "rhs" field of the two parameters of $U_5^8$ ($\hat{D}_8^8$ and $\hat{D}_9^8$) will have 5 as its value; for example, $rhs(\hat{D}_6^2) = rhs(\hat{D}_7^2) = 4$ (i.e., $U_4^2$); $rhs(\hat{D}_8^8) = rhs(\hat{D}_9^8) = 5$ (i.e., $U_5^8$). Also, $philhs(U_4^2) = 6$ (i.e., $\hat{D}_6^2$), $phiarity(U_4^2) = 2$ (i.e., two parameters), $philhs(U_5^8) = 8$ (i.e., $\hat{D}_8^8$), $phiarity(D_5^8) = 2$ (i.e., two parameters). The "arc" field of each parameter ($\hat{D}$) will contain the proper value, too. When the above procedure is done, we have AllDef table with nine entries and AllUse table with nine entries. Now we are ready to execute the routines shown in TABLE 5 and TABLE 6. For brevity, only the routine in TABLE 5 will be explained in detail below.

Initially, a stack is initialized at block 910 and the SEARCH procedure is called at block 912 with Entry as its operand. As stated above, the SEARCH procedure traverses the dominator tree nodes, in which Entry is the first node.

Since there are no statements in node Entry, the procedure proceeds directly to block 960. Block 960 calls SEARCH with Exit as its operand. There are no statements in Exit, thus the procedure 900 directly proceeds to block 978 where the procedure returns from SEARCH(Exit). It should be noted that at block 960, the procedure determined that there were no more children in the dominator tree for node Exit. The procedure 915 then proceeded to block 962 where it was determined that Exit had no statements. The procedure 900 thus proceeds directly to block 978.

The procedure 915 returns from SEARCH(Exit) and calls SEARCH with node 1 as its operand. Node 1 is the next child of node ENTRY in the dominator tree. The variable A is assigned the first statement in node 1, namely $D_1^1 = 1$ (i.e., $K_1 \leftarrow 1$). Since there are no variables used in RHS(A), the procedure proceeds to block 932. Block 932 assigns the first variable defined in LHS(A) to variable V, namely $D_1^1$. $D_1^1$ is an ordinary assignment, thus a def-def chain is inserted from the Top of the Stack (TOS) to the definition of V. However, since the TOS is currently empty $rdef(D_1^1) = 0$. $D_1^1$ is not an operand of a $\phi$-function thus $D_1^1$ is pushed onto the TOS The procedure 915 proceeds to block 950 where variable Y is assigned the first successor of node 1, namely node 2. Next, variable j is assigned the value one because node 2 is the first predecessor of node 1. For each $\phi$-function in node Y a def-use chain is inserted. Consequently, the following fields are defined: $usib(\hat{U}_6^2) \leftarrow uchild(D_1^1) = 0$; $rdef(\hat{U}_6^2) \leftarrow 1$; $uchild(D_1^1) \leftarrow 6$.

Next, block 960 calls SEARCH with node 2 as its operand. A is assigned the first statement in node 2 namely $\phi(\hat{D}_6^2, \hat{D}_7^2) = U_4^2$. Procedure 915 traverses the flowchart without any developments. Eventually, procedure 915 proceeds to block 946, where A is assigned the next statement in node 2, namely $D_4^2 = \phi(\hat{U}_6^2, \hat{U}_7^2)$. Since A is not an ordinary assignment, block 924 is false for both variables used in the RHS(A). Consequently, the procedure 915 proceeds to block 932, where V is assigned the first variable defined in LHS(A), namely $D_4^2$. Once again, A is not an ordinary assignment, thus the procedure 915 proceeds directly to block 938. The definition is not an operand of a $\phi$-function, thus block 938 is true. The definition $D_4^2$ is pushed onto the TOS.

There are no more variables in LHS(A), thus the procedure 900 proceeds to block 944. Block 944 is true and the procedure 915 will go to block 922, but nothing will happen all the way to block 944, and the procedure 915 will eventually proceed to block 950. Node 2 has two successors: node 3 and node 7. Neither of these two nodes has any $\phi$ defs, and thus, the procedure 915 will eventually proceed to block 960.

Block 960 calls SEARCH with node 3 as the operand. There are no statements of interest in node 3 (i.e., nothing concerning K). Consequently, the procedure 915 inevitably proceeds back to block 960 where SEARCH is called with node 4 as the operand. Once again, there are no statements of interest, and eventually procedure 915 returns from SEARCH(node 4). Similarly, procedure 915 calls SEARCH(node 5) and returns from that procedure call. The procedure returns from SEARCH(node 4) and SEARCH(node 5) since neither of them have any children in the dominator tree.

Next, SEARCH(node 6) is called. At block 920 variable A is assigned $D_6^2=U_1^6+1$ and at block 922 V is assigned the first variable in RHS(A) namely $U_1^6$. A is an ordinary assignment, thus a def-use chain is inserted. Currently, $D_4^2$ is on the TOS. Therefore, the following fields in the compact representation are defined: usib $(U_1^6)\leftarrow$uchild $(D_4^2)=0$: rdef $(U_1^6)\leftarrow 4$; uchild $(D_4^2)\leftarrow 1$. There are no more variables in the RHS(A), thus procedure 915 moves to block 932 where V is assigned the variable $D_2^6$. Variable $D_2^6$ is an ordinary assignment, thus a def-def chain is inserted. Once again, $D_4^2$ is on the TOS, and the following fields are defined: dsib($D_2^6$)$\leftarrow$dchild $(D_4^2)=0$; rdef $(D_2^6)\leftarrow 4$; dchild $(D_4^2)\leftarrow 2$. $D_2^6$ is not an operand of a $\phi$-function, and thus $D_2^6$ is pushed onto the TOS at block 940. Currently, the stack contains the following entries $\{D_2^6, D_4^2, D_1^1\}$, where the left most entry is the TOS.

Procedure 915 moves to block 950, where Y is assigned node 8. Node 8 is the first variable preceding node 6, thus j is set to one. For each $\phi$-function in node 8, a def-use chain is inserted. Thus, the following fields are defined: usib($\hat{U}_8^8$)$\leftarrow$uchild $(D_2^6)=0$; rdef $(\hat{U}_8^8)\leftarrow 2$; uchild $(D_2^6)\leftarrow 8$. There are no more successors of node 6 and there are no more children of node 6, thus procedure 915 proceeds to block 964. Block 964 assigns the variable $D_2^6$ to V and since the definition $D_2^6$ is not an operand of a $\phi$-function, $D_2^6$ is popped from the TOS. Procedure 915 then returns from SEARCH(node 6).

At this point, there are no more children of node 3. Consequently, procedure 915 returns from SEARCH-(node 3).

The remainder of the procedure is identical with that described above. Briefly, procedure 915 calls nodes 7 and 8 and repeats the above procedure. The following fields are defined during those procedure calls: usib-$(U_2^7)\leftarrow$uchild $(D_4^2)=1$; rdef $(U_2^7)\leftarrow 4$; uchild $(D_4^2)\leftarrow 2$; dsib $(D_3^7)\leftarrow$dchild $(D_4^2)=2$; rdef $(D_3^7)\leftarrow 4$; dchild $(D_4^2)\leftarrow 3$; usib $(\hat{U}_9^8)\leftarrow$uchild $(D_3^7)=0$; rdef $(\hat{U}_9^8)\leftarrow 3$; uchild $(D_3^7)\leftarrow 9$; usib $(U_3^8)\leftarrow$uchild $(D_5^8)=D$; rdef$(U_3^8)\leftarrow 5$; uchild $(D_5^8)\leftarrow 3$. Nodes 9, 10, and 11 are called without any fields being defined. Node 12 is called, and the following fields are defined: usib($\hat{U}_7^2$)$\leftarrow$uchild $(D_5^8)=3$; rdef $(\hat{U}_7^2)\leftarrow 5$; uchild $(D_5^8)\leftarrow 7$.

Procedure 915 eventually returns from each procedure call, and finally returns to the main procedure 900. At the end of procedure 915 the stack is again empty and the compact data flow representation is complete. TABLE 23 shows the result of the above example. Only values of fields relevant to the following discussion are shown.

TABLE 23

| | | | |
|---|---|---|---|
| $D_1^1$ | var = K | pres = 0 | node = 1 |
| | rdef = 0 | uchild = 6 | dchild = 0 |
| | dsib = 0 | phiarity = 0 | |
| $D_2^6$ | var = K | pres = 0 | node = 6 |
| | rdef = 4 | uchild = 8 | dchild = 0 |
| | dsib = 0 | phiarity = 0 | |
| $D_3^7$ | var = K | pres = 0 | node = 7 |
| | rdef = 4 | uchild = 9 | dchild = 0 |
| | dsib = 2 | phiarity = 0 | |
| $D_4^2$ | var = K | pres = 0 | node = 2 |
| | rdef = 0 | uchild = 2 | dchild = 2 |
| | dsib = 0 | phiarity = 2 | phirhs = 6 |
| $D_5^8$ | var = K | pres = 0 | node = 8 |
| | rdef = 0 | uchild = 7 | dchild = 0 |
| | dsib = 0 | phiarity = 2 | phirhs = 8 |
| $\hat{D}_6^2$ | var = K | node = 2 | ruse = 0 |
| | dsib = 0 | arc = 1 | rhs = 4 |
| $\hat{D}_7^2$ | var = K | node = 2 | ruse = 3 |
| | dsib = 0 | arc = 2 | rhs = 4 |
| $\hat{D}_8^8$ | var = K | node = 8 | ruse = 1 |
| | dsib = 0 | arc = 3 | rhs = 5 |
| $\hat{D}_9^8$ | var = K | node = 8 | ruse = 2 |
| | dsib = 0 | arc = 4 | rhs = 5 |
| $U_1^6$ | var = k | node = 6 | rdef = 4 |
| | usib = 0 | arc = 0 | lhs = 2 |
| | uusib = 2 | | |
| $U_2^7$ | var = K | node = 7 | rdef = 4 |
| | usib = 1 | arc = 0 | lhs = 3 |
| | uusib = 0 | | |
| $U_3^8$ | var = K | node = 8 | rdef = 5 |
| | usib = 0 | arc = 0 | lhs = 4. |
| | uusib = 0 | | |
| $U_4^2$ | var = K | node = 2 | philhs = 6 |
| | ruse = 0 | usib = 0 | phiarity = 2 |
| $U_5^8$ | var = K | node = 8 | philhs = 8 |
| | ruse = 0 | usib = 0 | phiarity = 2 |
| $\hat{U}_6^2$ | var = K | node = 2 | rdef = 1 |
| | usib = 0 | arc = 1 | lhs = 4 |
| | uusib = 0 | | |
| $\hat{U}_7^2$ | var = K | node = 2 | rdef = 5 |
| | usib = 3 | arc = 2 | lhs = 4 |
| | uusib = 0 | | |
| $\hat{U}_8^8$ | var = K | node = 8 | rdef = 2 |
| | usib = 0 | arc = 3 | lhs = 5 |
| | uusib = 0 | | |
| $\hat{U}_9^8$ | var = K | node = 8 | rdef = 3 |
| | usib = 0 | arc = 4 | lhs = 5 |
| | uusib = 0 | | |

Now that the compact date flow representation has been constructed, it can be used to solve a variety of data flow problems. For example, the Live Variable problem can be solved using the data structure of TABLE 22 and the access function "VisitUse" (which is passed "LiveTestRtn" as its second parameter (i.e., "ApplyThisFtn")). In the following example, we would like to know if $D_3^7$ (whose AllDef index is 3) is live or not (i.e., if the definition of K at node 7 is ever used before it is overwritten by other definitions of K).

TABLES 24 and 25 show a simple routine for utilizing the compact data flow representation and access functions to determine whether a particular variable is live. One skilled in the art would readily be able to write other routines for utilizing the compact data flow representation.

TABLE 24

```
int IsLive = 0; /*initially 0*/
UseVisited[*] = 0;
VisitUse(3, LiveTestRtn); /*See if D⁷₃ is live or not*/
    if (isLive == 0)
        print ("D⁷₃ is dead - never used before
    overwritten");
    else
        print ("D⁷₃ is live");
    endif
```

TABLE 25

```
proc LiveTestRtn (useId)
    int use;
    if (AllUse[useId].arc == 0)
    /*Otherwise, it's a parameter of a φ-function*/
        IsLive = 1;
        print ("D⁷₃ is live");
        print ("at node = ", AllUse[useId].node,
            "index = ", useId);
    endif;
end LiveTestRtn;
```

Initially, as shown in TABLE 24, VisitUse (TABLE 12) is called with 3 as an operand. As indicated in the compact representation in TABLE 23, AllDef[3].uchild equals 9, thus VisitReachedUse (TABLE 13) is called with 9 as an operand (LiveTestRtn is not shown as an operand for brevity). UseVisited[9] is not equal to zero, thus UseVisited[9] is assigned the value one. Next, LiveTestRtn (TABLE 25) is called with 9 as an operand. AllUse[9].arc equals 2, thus LiveTestRtn is exited.

AllUse[9].arc equals 2, hence VisitUseViaDef (TABLE 14) is called with the operand AllUse[9].lhs (which is defined in TABLE 23 as 5). AllDef(5).pres equals zero, hence it is not a preserving definition. AllDef[5].phiarity equals 2, thus VisitUse is called with five as its operand. The same sequence of steps will be followed as with VisitUse(7). VisitUse(4) is called from within the VisitUseViaDef procedure. AllDef[4].uchild=2, thus VisitReachedUse(2) is called. Eventually LiveTestRtn(2) is called. Since AllUse[2].arc equals zero IsLive is assigned the value one, and the phrase "D₃⁷ is live at node 7 index=3" is printed. the procedure then returns from LiveTestRtn to VisitReachedUse. AllUse[2].arc equals zero, but AllUse[2].usib equals 1, and therefore VisitReachedUse(1) is called.

It should be readily apparent to those skilled in the art how the above described routines manipulate the data found in the compact data flow representation to determine the liveness of a particular variable. Thus, after repeating the steps describe above, it is determined that along with D₃⁷ being live at node 7 index 2, definition D₃⁷ is live at node 6, index 1 and node 8, index 3. Eventually, the routine returns to the routine outlined in TABLE 24, in which it asks whether IsLive is equal to zero or one. If it equals one, as is the case in this example, the phrase "D₃⁷ is live" is printed While the invention has been particularly shown and described with reference to preferred embodiments thereof, it will be understood by those skilled in the art that various changes in form and details may be made therein without departing from the spirit and scope of the invention.

What is claimed is:

1. A computer-based system for optimizing computer code, comprising:
    optimizer means configured to optimize or parallelize a source program, said source program represented by a control flow graph, wherein said optimizing means comprises:
    (a) constructing means for constructing a compact data flow representation from said control flow graph, wherein said constructing means includes generating means for generating relevant phi-nodes for said control flow graph and chaining means for constructing a definitions table and a uses table from said control flow graph and said phi-nodes, wherein said definitions table insert at most one def-def chain and at most one use-def chain into each entry in said table and said uses table inserts at most one def-use chain and at most one use-use chain into each entry in said table; and
    (b) evaluator means, connected to said constructing means, for evaluating said compact data flow representation in relation to a data flow framework in order to determine a solution to a particular data flow problem.

2. The computer-based system of claim 1, wherein said definitions table comprises a set of all definitions in said source program and wherein said uses table comprises a set of all uses in said source program.

3. The computer-based system of claim 1, further comprising means for determining all definitions reaching a definition using said compact data flow representation.

4. The computer-based system of claim 1, further comprising means for determining all uses reached by a definition using said compact data flow representation.

5. The computer-based system of claim 1, further comprising means for determining all definitions reaching a use using said compact data flow representation.

6. The computer-based system of claim 1, further comprising means for determining all definitions reached by a definition using said compact data flow representation.

7. The computer-based system of claim 1, further comprising means for determining all uses reaching a definition using said compact data flow representation.

8. The computer-based system of claim 1, further comprising means for determining all uses reaching a use using said compact data flow representation.

9. The computer-based system of claim 1, further comprising means for determining all uses reached by a use using said compact data flow representation.

10. The computer-based system of claim 1, further comprising means for determining all definitions reached by a use using said compact data flow representation.

11. A computer-based method for optimizing source code, comprising the steps of:
    (1) entering a source program into an optimizer, said source program represented by a control flow graph;
    (2) placing φ-functions into said control flow graph;
    (3) generating a dominator tree from said control flow graph, said dominator tree having nodes containing statements from said source program;
    (4) constructing a compact data flow representation from said dominator tree, said compact data flow representation includes a definitions (AllDef) table and a uses (AllUse) table, wherein said definitions table insert at most one def-def chain and at most one use-def chain into each entry in said definitions table and said uses table inserts at most one def-use chain and at most one use-use chain into each entry in said uses table; and (5) evaluating said compact data flow representation with respect to a data flow framework, in order to determine a solution to a data flow problem.

12. The method of claim 11, wherein said definitions table comprises a set of all definitions in said source program and wherein said uses table comprises a set of all uses in said source program.

13. The method of claim 1, wherein each definition in said definitions table has at least one of an rdef field, a uchild field, a dchild field, a dsib field, a ruse field, a udsib field, an arc field, and a rhs field and wherein each use in said uses table has at least one of an rdef field, an usib field, a uusib field, an arc field, a lhs field, an ruse field, a uusib field, a uchild field and a dchild field.

14. The computer-based system of claim 13, wherein said step of placing $\phi$-functions comprises the steps of:
   (a) defining a dominator tree from said first control flow graph;
   (b) defining a dominance frontier from said dominator tree and said control flow graph; and
   (c) placing said $\phi$-functions in accordance with said dominance frontier.

15. The method of claim 13, wherein said step (4) comprises the step of constructing a compact data flow representation of use-use and use-def chains, comprising the steps of:
   (A) initializing a stack; and
   (B) traversing said dominator tree nodes using a pre-order and post-order traversal;
      (i) wherein said pre-order traversal of said dominator tree nodes comprises the steps of,
         (a) determining if there is at least one statement in the current node being visited in said dominator tree, otherwise branch to step (ii);
         (b) inserting a def-use chain from the top of said stack (TOS) to the use of each variable used in the right hand side of said statement if said statement is an ordinary assignment; and
         (c) pushing the def of each variable defined in the left hand side of said statement onto said stack if said use is not an operand of a $\phi$-function;
         (d) determining if there is more than one statement in the current node being visited, and if so, then repeat steps (b) through (c) for the remaining statements in the current node being visited;
         (e) inserting a def-use chain, for each $\phi$-function in each successor of the current node being visited, from the TOS to the j-th operand in the RHS of said $\phi$-function, wherein the j-th operand delineates a successor of the current node being visited;
      (ii) recursively repeating step (B) for all the children of the current node being visited; and
      (iii) wherein said post-order traversal of said dominator tree nodes comprises the step of popping the TOS for each variable defined in the LHS of each statement in the current node being visited in said dominator tree if said definition is not an operand of a $\phi$-function.

16. The method of claim 13, wherein said step (4) comprises the step of constructing a compact data flow representation of use-use and use-def chains, comprising the steps of:
   (A) initializing a stack; and
   (B) traversing said dominator tree nodes using a pre-order and post-order traversal;
      (i) wherein said pre-order traversal of said dominator tree nodes comprises the steps of,
         (a) determining if there is at least one statement in the current node being visited in said dominator tree, otherwise branch to step (ii);
         (b) inserting a use-use chain from the top of said stack (TOS) to the use of each variable used in the right hand side of said statement if said statement in said dominator tree is an ordinary assignment and the TOS is a use;
         (c) pushing the use of each variable defined in the right hand side of said statement onto said stack if the use is not an operand of a $\phi$-function;
         (d) inserting a use-def chain from the TOS to the definition of each variable defined in the left hand side of said statement if said statement is an ordinary assignment and the TOS is a use;
         (e) pushing the definition of each variable defined in the left hand side of said statement onto said stack if the definition is not an operand of a $\phi$-function;
         (f) determining whether there is more than one statement in the current node being visited, and if so, then repeat steps (b) through (e) for the remaining statements in the current node being visited;
         (g) inserting a use-def chain, for each $\phi$-function in each successor of the current node being visited, from the TOS to the j-th operand in the LHS of said $\phi$-function, wherein the j-th operand delineates a successor of the current node being visited; and
      (ii) recursively repeating step (B) for all the children of the current node being visited; and
      (iii) wherein said post-order traversal of said dominator tree nodes comprises the steps of,
         (a) popping the TOS for each variable defined in the LHS of each statement in the current node being visited in said dominator tree if the definition is not an operand of a $\phi$-function; and
         (b) popping the TOS for each variable defined in the RHS of each statement in the current node being visited in said dominator tree if the use is not an operand of a $\phi$-function.

17. The method of claim 13, further comprising a step (6) of determining all uses reaching a use uOld, wherein step (6) comprises the steps of:
   (a) identifying,
      (i) a use uNew by following said ruse fields, wherein said use uNew has a use-use chain into said use uOld, and if said use uNew is a $\phi$-function determine all uses reaching said definition dNew, wherein said definition dNew is a parameter of said $\phi$-function, otherwise recursively repeat step (a) to find all uses reaching said use uNew, and
      (ii) said definition dNew by following said rdef fields, wherein said definition dNew has a def-use chain into said use uOld;
   (b) determining whether said definition dNew is a preserving definition, killing definition, or $\phi$-function, wherein if
      (i) said definition dNew is a preserving definition or a $\phi$-function, then determine the set of uses that reach a definition dOld; and (ii) said definition dNew is a killing definition, then stop following said ruse chains.

18. The method of claim 13, further comprising a step (6) of determining all definitions reaching a definition dOld using said compact data flow representation, wherein step (6) comprises the steps of:
    (a) identifying a definition dNew by following said rdef fields, wherein said definition dNew has a def-def chain into said definition dOld;
    (b) determining whether said definition dNew is a preserving definition, killing definition, or $\phi$-function;
    (c) if said definition dNew is a preserving definition, then determine the set of definitions that reach AllDef[dNew] by recursively following AllDef[dNew].rdef chains;
    (d) if said definition dNew is a killing definition, then stop following said rdef fields; and
    (e) if said definition dNew is a $\phi$-function, then determine the set of definitions that reach AllDef[dNew] by recursively following said rdef fields of the AllUse entries representing the arguments of said $\phi$-function.

19. The method of claim 13, further comprising a step (6) of determining all definitions reaching a use uOld using said compact data flow representation, wherein step (6) comprises the steps of:
    (a) identifying a definition dNew by following said rdef fields, wherein said definition dNew has a def-use chain into said use uOld;
    (b) determining whether said definition dNew is a preserving definition, killing definition, or $\phi$-function;
    (c) if said definition dNew is a preserving definition, then determine the set of definitions that reach AllDeg[dNew] by recursively following AllUse[dNew].rdef chains;
    (d) if said definition dNew is a killing definition, then stop following said rdef fields; and
    (e) if said definition dNew is a $\phi$-function, then determine the set of definition that reach AllDef[dNew] by recursively following said rdef fields of the AllUse entries representing the arguments of said $\phi$-function.

20. The method of claim 13, further comprising a step (6) of determining all definitions reached by a definition dOld using said compact data flow representation, wherein step (6) comprises the steps of:
    (a) identifying a definition dNew having a def-def chain from said definition dOld by following AllDef[dOld].dchild and then following AllDef[dNew].dsib;
    (b) if said definition dNew is a preserving definition, then determine the set of definitions that are reached by AllDef[dNew] by recursively repeating steps (a) and (b); and
    (c) determining whether any AllUse entry reached by AllDef[dOld] is an argument of a $\phi$-function by examining said arc field of said AllUse entry, and if said AllUse entry is an argument of said $\phi$-function then recursively follow said lhs field of said AllUse entry to identify a second definition dOld and recursively repeating steps (a) through (c).

21. The method of claim 13, further comprising a step (6) of determining all uses reached by a definition dOld using said compact data flow representation, wherein step (6) comprises the steps of:
    (a) identifying a use uNew having a def-use chain from said definition dOld by following AllDef[dOld].uchild and then following AllUse[uNew].usib;
    (b) identify a definition dNew and determining the set of uses that are reached by AllDef[dNew] by recursively repeating steps (a) and (b);
    (c) determining whether said definition dNew is preserving, and if so, then determine the set of definitions that are reached by AllDef[dNew] by recursively following the AllDef[dNew].dsib chains; and
    (d) determining whether any AllUse entry reached by AllDef[dOld] is an argument of a $\phi$-function by examining said arc field of said AllUse entry, and if said AllUse entry is an argument of said $\phi$-function then recursively follow said lhs field of said AllUse entry to identify a second definition dOld and recursively repeating steps (a) through (d).

22. The method of claim 13, further comprising a step (6) of determining all uses reaching a definition dOld using said compact data flow representation, wherein step (6) comprises the steps of:
    (a) identifying,
        (i) (A) a use uOld by following said ruse field, wherein said use uOld has a use-def chain into said definition dOld, and (B) if said use uOld is a $\phi$-function determine all uses reaching a definition dNew, wherein said definition dNew is a parameter of said $\phi$-function, otherwise identify a use uNew that has a use-use chain into said use uOld and recursively repeat (a)(i)(B), and
        (ii) a definition dNew by following said rdef field, wherein said definition dNew has a def-def chain into said definition dOld;
    (b) determining whether said definition dNew is a preserving definition, killing definition, or $\phi$-function, and if
        (i) said definition dNew is a preserving definition, then determine the set of uses that reach AllDef[dNew] by recursively following the AllDef[dNew].ruse chains and recursively repeating steps (a) and (b);
        (ii) said definition dNew is a killing definition, then stop following said ruse chains; and
        (iii) said definition dNew is a $\phi$-function, then determine a set of definitions that reach AllDet[dNew] by recursively following said ruse fields of the AllUse entries representing the arguments of said $\phi$-function, then recursively repeat steps (a) and (b).

23. The method of claim 13, further comprising a step (6) of determining all uses reached by a use uOld using said compact data flow representation, wherein step (6) comprises the steps of:
    (a) identifying a use uNew, wherein said use uNew has a use-use chain from said definition dOld, by following AllUse[uOld].uchild and then following AllUse[uNew].uusib and for each uNew repeat step (a);
    (b) identifying a definition dNew by following AllUse[uOld].dchild, wherein said definition dNew has a use-def chain from said use uOld,
    (c) recursively following AllDef[dNew].udsib;
    (d) determining whether said definition dNew is a preserving definition, if said definition dNew is preserving then determine all uses reached by a definition dOld; and (e) determining whether any AllDef entry reached by AllDef[uOld] is an argument of a $\phi$-function by examining said arc field of said AllDef entry, and if said AllDef entry is an argument of said $\phi$-function then recursively follow said rhs field of said AllDef entry to identify uNew.

24. The method of claim 13, further comprising a step (6) of determining all definitions reached by a use uOld using said compact dam flow representation, wherein step (6) comprises the steps of:
   (a) identifying a definition dNew by first following AllUse[uOld].dchild, wherein said definition dNew has use-def chain from uOld;
   (b) recursively following AllDef[dNew].udsib;
   (c) determining whether said definition dNew is a preserving definition, and if so, then determine all the definitions reached by said definition dNew;
   (d) determining whether any AllDef entry reached by AllDef[uOld] is an argument of a $\phi$-function by examining said arc field of said AllDef entry, and if said AllDef entry is an argument of said $\phi$-function then recursively follow said rhs field of said AllDef entry to uNew;
   (e) recursively repeating step (6) for all of said uses uNew; and
   (f) identifying a use uNew by first following AllUse[uOld].

* * * * *